US011927967B2

(12) United States Patent
Jain et al.

(10) Patent No.: US 11,927,967 B2
(45) Date of Patent: Mar. 12, 2024

(54) USING MACHINE LEARNING MODELS FOR GENERATING HUMAN-LIKE TRAJECTORIES

(71) Applicant: Woven by Toyota, U.S., Inc., Palo Alto, CA (US)

(72) Inventors: Ashesh Jain, Sunnyvale, CA (US); Anantha Rao Kancherla, Palo Alto, CA (US); Taggart C Matthiesen, Kentfield, CA (US)

(73) Assignee: Woven by Toyota, U.S., Inc., Palo Alto, CA (US)

( * ) Notice: Subject to any disclaimer, the term of this patent is extended or adjusted under 35 U.S.C. 154(b) by 460 days.

(21) Appl. No.: 17/008,496

(22) Filed: Aug. 31, 2020

(65) Prior Publication Data

US 2022/0066459 A1     Mar. 3, 2022

(51) Int. Cl.
| | |
|---|---|
| *G05D 1/02* | (2020.01) |
| *G05D 1/00* | (2006.01) |
| *G06F 18/214* | (2023.01) |
| *G06N 5/01* | (2023.01) |
| *G06N 20/00* | (2019.01) |

(52) U.S. Cl.
CPC ........... *G05D 1/0221* (2013.01); *G05D 1/027* (2013.01); *G06F 18/214* (2023.01); *G06N 5/01* (2023.01); *G06N 20/00* (2019.01); *G05D 2201/0213* (2013.01)

(58) Field of Classification Search
CPC ................ G05D 1/0221; G05D 1/027; G05D 2201/0213; G05D 1/0214; G05D 1/0088; G05D 1/00–2201/0218; G06N 5/003; G06N 20/00; G06N 3/0472; G06N 3/0454; G06N 3/084; G06K 9/6256; G06V 10/774; G06V 10/82; G06V 20/56; G06V 10/00–2201/136
USPC ......................................................... 701/27
See application file for complete search history.

(56) References Cited

U.S. PATENT DOCUMENTS

| | | | | |
|---|---|---|---|---|
| 10,782,693 | B2 * | 9/2020 | Zhang ..................... | G08G 1/161 |
| 11,157,010 | B1 * | 10/2021 | Narang ................ | G05D 1/0221 |
| 2016/0320200 | A1 * | 11/2016 | Delling ............. | G01C 21/3605 |
| 2018/0011494 | A1 * | 1/2018 | Zhu ........................ | B60W 10/18 |
| 2018/0197440 | A1 * | 7/2018 | Ramachandra ....... | B60W 50/14 |

(Continued)

*Primary Examiner* — Angelina Shudy
*Assistant Examiner* — Mohamed Abdo Algehaim
(74) *Attorney, Agent, or Firm* — Christopher G. Darrow; Darrow Mustafa PC

(57) ABSTRACT

In one embodiment, a computing system of a vehicle may access sensor data associated with a surrounding environment of a vehicle. The system may generate, based on the sensor data, a first trajectory having one or more first driving characteristics for navigating the vehicle in the surrounding environment. The system may generate a second trajectory having one or more second driving characteristics by modifying the one or more first driving characteristics of the first trajectory. The modifying may use adjustment parameters based on one or more human-driving characteristics of observed human-driven trajectories such that the one or more second driving characteristics satisfy a similarity threshold relative to the one or more human-driving characteristics. The system may determine, based on the second trajectory, vehicle operations to navigate the vehicle in the surrounding environment.

20 Claims, 16 Drawing Sheets

(56) References Cited

U.S. PATENT DOCUMENTS

| | | | |
|---|---|---|---|
| 2018/0292222 A1* | 10/2018 | Lin | G05D 1/0214 |
| 2018/0292830 A1* | 10/2018 | Kazemi | G05D 1/0221 |
| 2019/0001964 A1* | 1/2019 | Lin | B60W 30/02 |
| 2019/0072960 A1* | 3/2019 | Lin | B60W 40/09 |
| 2019/0072965 A1* | 3/2019 | Zhang | G08G 1/161 |
| 2019/0072966 A1* | 3/2019 | Zhang | G05D 1/0088 |
| 2019/0072973 A1* | 3/2019 | Sun | B62D 15/0265 |
| 2019/0113927 A1* | 4/2019 | England | G06N 5/046 |
| 2019/0187706 A1* | 6/2019 | Zhou | B60W 60/00 |
| 2019/0204842 A1* | 7/2019 | Jafari Tafti | G06N 3/08 |
| 2019/0221121 A1* | 7/2019 | Guo | G06V 10/82 |
| 2019/0232974 A1* | 8/2019 | Reiley | G06V 20/597 |
| 2019/0266516 A1* | 8/2019 | Olabiyi | G08G 1/0112 |
| 2019/0337508 A1* | 11/2019 | Foltin | B60W 40/09 |
| 2019/0344783 A1* | 11/2019 | Bertollini | B60W 50/0098 |
| 2019/0367019 A1* | 12/2019 | Yan | B60W 60/0027 |
| 2019/0367020 A1* | 12/2019 | Yan | G06N 3/08 |
| 2019/0369637 A1* | 12/2019 | Shalev-Shwartz | G01C 21/3415 |
| 2019/0384303 A1* | 12/2019 | Muller | G01S 7/417 |
| 2020/0081442 A1* | 3/2020 | Kizumi | B60W 30/00 |
| 2020/0225676 A1* | 7/2020 | Telpaz | B60W 50/0098 |
| 2020/0241533 A1* | 7/2020 | Lin | G05D 1/0088 |
| 2020/0290509 A1* | 9/2020 | Pandit | B60Q 5/005 |
| 2020/0298863 A1* | 9/2020 | Lin | G05D 1/0214 |
| 2020/0339160 A1* | 10/2020 | Rosenbaum | B60W 40/09 |
| 2020/0370893 A1* | 11/2020 | Kang | G06V 10/764 |
| 2021/0009133 A1* | 1/2021 | Mcnew | B60W 40/09 |
| 2021/0065060 A1* | 3/2021 | Minoya | G06N 3/045 |
| 2021/0070286 A1* | 3/2021 | Green | G05D 1/0088 |
| 2021/0086779 A1* | 3/2021 | Benisch | B60W 60/001 |
| 2021/0163038 A1* | 6/2021 | Huang | G06V 20/52 |
| 2021/0171024 A1* | 6/2021 | Grigorescu | B60W 60/0011 |
| 2021/0173402 A1* | 6/2021 | Chang | B60W 40/09 |
| 2021/0181754 A1* | 6/2021 | Cui | G05D 1/0221 |
| 2021/0213959 A1* | 7/2021 | Shahriari | G05D 1/0214 |
| 2021/0264244 A1* | 8/2021 | Xian | G06F 16/24578 |
| 2022/0011776 A1* | 1/2022 | Narang | G05D 1/0214 |
| 2022/0013008 A1* | 1/2022 | Katz | G08G 1/0112 |
| 2022/0026913 A1* | 1/2022 | Narang | G06V 20/56 |
| 2022/0101020 A1* | 3/2022 | Evans | G06N 20/00 |
| 2022/0135072 A1* | 5/2022 | Narang | B60W 60/0015 701/26 |
| 2022/0161826 A1* | 5/2022 | Schur | B60W 60/0027 |
| 2022/0212693 A1* | 7/2022 | Fang | B60W 60/0011 |
| 2022/0214693 A1* | 7/2022 | Narang | G05D 1/0214 |
| 2022/0348215 A1* | 11/2022 | Vardharajan | B60W 60/00 |

* cited by examiner

USING MACHINE LEARNING MODELS FOR GENERATING HUMAN-LIKE TRAJECTORIES

BACKGROUND

Autonomous vehicles (AVs) or manually-driven vehicles with driver-assistance features may navigate through their surrounding environment based on the perception data of the associated surrounding environment. A vehicle typically perceives its environment using sensors such as cameras, radars, and LiDARs. A computing system (e.g., an on-board computer and/or a remote server computer) may then process and analyze the sensor data to make operational decisions in response to situations detected in the surrounding environment. For a particular scenario encountered by an AV in the driving environment, the AV may algorithmically generate a robotic trajectory to navigate the vehicle in accordance with that particular scenario.

However, even though the robotic trajectories may be safe and technically correct for navigating the VA, they may lead to unnatural or unpleasant riding experience for passengers. For example, AV navigated based on robotic trajectories may have more aggressive acceleration processes than a human-driving vehicle.

DESCRIPTION OF EXAMPLE EMBODIMENTS

Figure 1A:
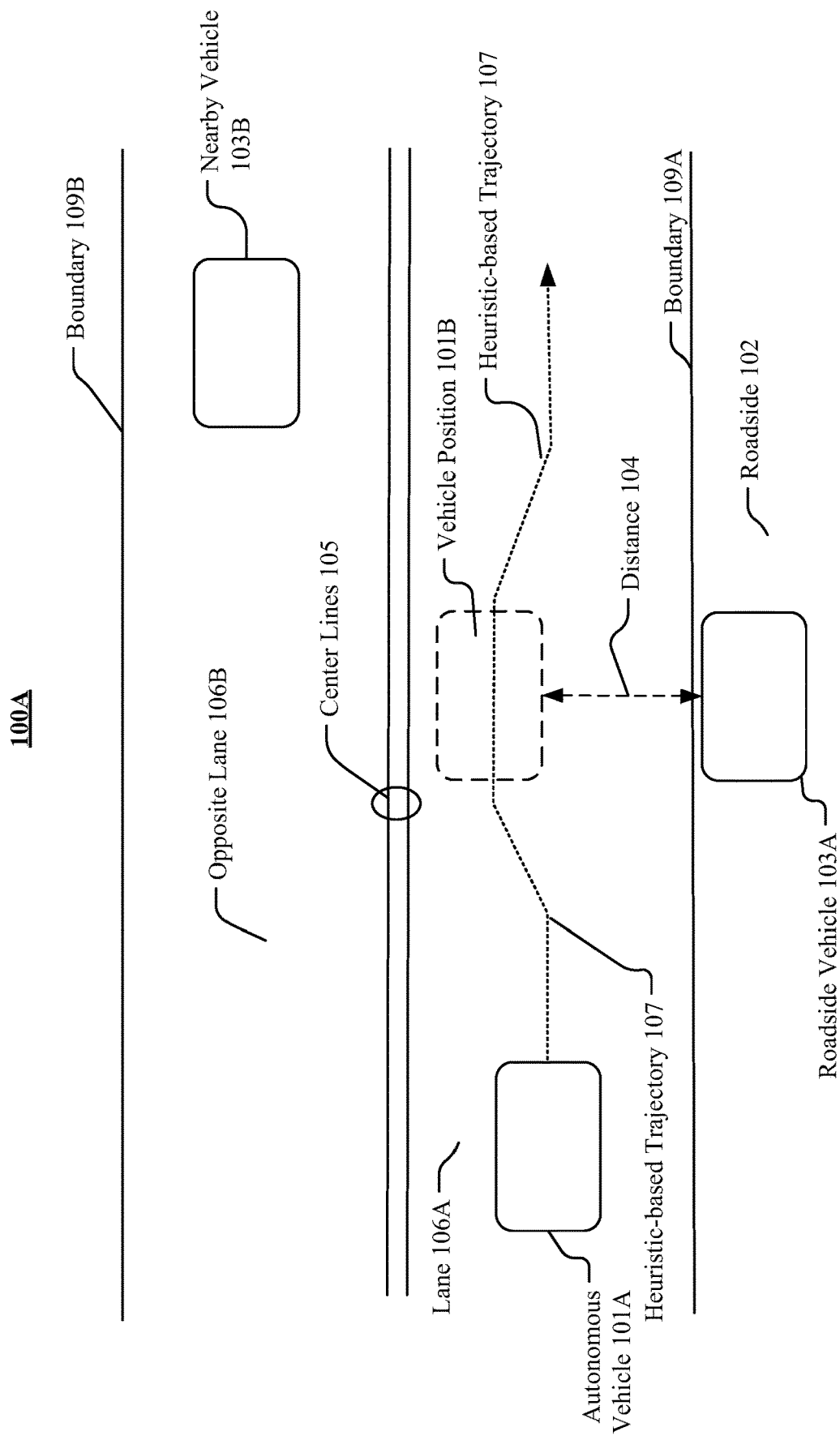
FIG. 1A illustrates an example heuristic-based trajectory used to navigate an autonomous vehicle in a surrounding environment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. In addition, the embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Existing autonomous vehicles (AVs) may algorithmically (e.g., using a motion planning algorithm) generate heuristic-based trajectories based on the perception data of the AV's surrounding environment and navigate the AVs using the heuristic-based trajectories. However, even though the algorithmically generated heuristic-based trajectories are technically correct and safe to be used for navigating the AVs in the surrounding environment, they may lead to unnatural or unpleasant riding experience for passengers. For example, the AVs navigated based on the heuristic-based trajectories may have more aggressive acceleration processes than vehicles that are driven by human drivers and the aggressive acceleration may negatively impact the riding experience of the passengers.

To solve this problem, particular embodiments of the system may use a machine-learning (ML) based trajectory generator (later referred to as "generator") to refine heuristic-based trajectories and generate refined trajectories that are more similar to human-driven trajectories. The ML-based trajectory generator may be trained using a generative adversarial network (GAN). For example, the ML-based trajectory generator may correspond to the generator model in the GAN framework and may be trained to process heuristic-based trajectories (denoted by T) and generate refined trajectories that are more human-like (these human-like trajectories, denoted by T', are considered to be a "fake" human-driven trajectory or "fake" human-driving trajectory). The GAN may include a discriminator which may be trained to discriminate between real human-driven trajectories (denoted by H) and fake human-driven trajectories (T'). During training, the generator may first process a number of heuristic-based trajectories to generate corresponding human-like trajectories. The discriminator may then be tasked with discriminating between the human-like trajectories (which are fake human-driven trajectories) and real human-driven trajectories. The discriminator may be optimized for correctly discriminating the input trajectories as being fake or real human-driven trajectories. The generator, on the other hand, may be optimized for fooling the discriminator into incorrectly classifying the human-like trajectories generated by the generator as being real human-driven trajectories. To ensure the generated human-like trajectories do not deviate from the heuristic-based trajectories too much (which could lead to unstable driving experience and cause safety issues), the generator may be optimized based on a loss function which compares the input heuristic-based trajectory with the corresponding human-like trajectory. The discriminator and generator may be trained sequentially or concurrently.

After the generator has been trained to a level that meets pre-determined criteria, the generator may be deployed to AVs to allow the AVs to be navigated with more human-like trajectories. At run time, the system may capture the perception data (e.g., images, LiDAR point cloud) of the AV's surrounding environment and generate a heuristic-based AV navigation trajectory based on the perception data (e.g., using a motion planning algorithm) and/or prediction data of the AV's surrounding environment. The system may feed the heuristic-based trajectory to the ML-based trajectory generator, which generates a corresponding human-like trajectory to be used to navigate the AV. Before adopting the generated human-like trajectory, the AV may perform a safety check to ensure that the generated human-like trajectory meets pre-determined safety criteria. When the human-like trajectory meets the pre-determined safety criteria, the system may use the human-like trajectory to navigate the vehicle in the surrounding environment. With the human-like trajectory generated by the trajectory generator, the AV may provide better riding experience to passengers. When the human-like trajectory fails to meet the safety criteria, the system may use the heuristic-based trajectory to navigate the vehicle in the surrounding environment to ensure the safety of the vehicle.

By using GAN to train the ML-based trajectory generator, the ML-based trajectory generator may be optimized based on the discrimination results of the discriminator without directly comparing the generated human-like trajectories to the real human-driven trajectories. By incrementally optimizing the discriminator based on the loss functions for the fake/real human-driven trajectories using supervised learning, the discriminator may get better and better over time for discriminating the fake/real human-driven trajectories. By incrementally optimizing the ML-based trajectory generator to fool the discriminator, the ML-based trajectory generator may get better and better over time for generating human-like trajectories that are more similar to real human-driven trajectories. By using the human-like trajectory to navigate the vehicle, the AV may provide better riding experience (e.g., a higher comfort level) that is more similar to vehicle driven by humans. By evaluating the human-like trajectories before usage and using the heuristic-based trajectory as fallback trajectories, the AV may ensure the safety of the vehicle when the human-like trajectories fail to meet pre-determined safety criteria. Furthermore, using the systems, methods, and processes as described in this disclosure, there are no limits to the number of human trajectories that can be used to train the ML model to get better at generating human-like trajectories. And, the ML model may be trained for different types of scenarios at the granular level (e.g., lane changes, lane boundaries, bicyclists, etc.) using observed human-driving data to get better at replicating heuristic-based trajectories to human-like trajectories. By using the large amount human-driving data of different scenarios to train the ML model, particular embodiments of the system may provide a scalable solution for generating human-like trajectories that would otherwise be very challenging for heuristic-based algorithms.

In particular embodiments, a vehicle trajectory (e.g., a human-driven trajectory, a human-like trajectory, or a heuristic-based trajectory) may describe the motion of the vehicle for navigating through a surrounding environment. A vehicle trajectory may be or include a vehicle moving path for the vehicle to move from a first point A to a second point B. The moving path may include or be associated with a series of spatial-temporal points (x, y, t). Each of the spatial-temporal point (x, y, t) may indicate a location of the vehicle along the moving path at a particular time moment. The whole trajectory may correspond to a particular time window (e.g., from a start time moment to an end time moment) and may have a particular point density over time (e.g., 100 points per 10 seconds). Each of the spatial-temporal point (x, y, t) may be associated with a number of trajectory parameters or vehicle parameters including, for example, but not limited to, a velocity, an acceleration along the moving path, an acceleration along the lateral direction, GPS coordinates, a steering angle, a moving direction, a braking paddle pressure, etc. Each of the associated parameter may have a particular distribution over the moving path of the associated trajectory or/and a particular distribution over time in the corresponding time window associated with the trajectory.

In particular embodiments, AVs may use sensors to capture perception data of the surrounding environment. In particular embodiments, the sensors used by AVs may include, for example, but are not limited to, cameras (e.g., optical camera, thermal cameras), LiDARs, radars, speed sensors, steering angle sensors, braking pressure sensors, a GPS, inertial measurement units (EUs), acceleration sensors, etc. In particular embodiments, the perception data and the vehicle data that are captured may include, for example, but are not limited to, environment images, speeds of other vehicles, acceleration of other vehicles, moving paths of other vehicles, driving trajectories of other vehicles, locations of other vehicles, signal status (e.g., on-off state of turning signals) of other vehicles, braking signal status of other vehicles, a distance to another vehicle, a relative speed to another vehicle, a distance to a pedestrian, a relative speed to a pedestrian, a distance to a traffic signal, a distance to an intersection, a distance to a road sign, a distance to curb, a relative position to a road line, positions of other traffic agents, a road layout, pedestrians, traffic status (e.g., number of nearby vehicles, number of pedestrians, traffic signals), time of day (e.g., morning rush hours, evening rush hours, non-busy hours), types of traffic (e.g., high speed moving traffic, accident events, slow moving traffic), road conditions (e.g., constructing zones, school zones, wet surfaces, ice surfaces), intersections, road signs (e.g., stop signs, road lines, cross walks), nearby objects (e.g., curbs, light poles, billboards), buildings, weather conditions (e.g., raining, fog, sunny, hot weather, cold weather), etc.

In particular embodiments, the collected perception data may include camera-based localization data including, for example, but not limited to, a point cloud, a depth of view, a two-dimensional profile of environment, a three-dimensional profile of environment, stereo images of a scene, a relative position (e.g., a distance, an angle) to an environmental object, a relative position (e.g., a distance, an angle) to road lines, a relative position in the current environment, a traffic status (e.g., high traffic, low traffic), etc. In particular embodiments, the perception data may include historical perception data accessed from a database. For example, the historical perception data may include map data that are generated based on previously collected perception data of the surrounding environment. In particular embodiments, the AVs may have a perception of the surrounding environment based on the perception data collected through one or more sensors in real-time or/and historical perception data stored in a vehicle database. In particular embodiments, the AV may include one or more computing systems (e.g., a data collection device, an on-board computer, a high-performance computer, a mobile phone, a tablet, a mobile computer, an embedded computing system) to process the perception data. In particular embodiments, the techniques described herein may be implemented by the computing system of the AV and/or a backend computing system. For example, the backend computing system is capable of running a simulation based on the techniques described herein.

FIG. 1A illustrates an example heuristic-based trajectory 107 used to navigate an autonomous vehicle in a surrounding environment 100A. In particular embodiments, the AV may use a computer algorithm (e.g., a motion planning algorithm) to algorithmically generate a heuristic-based trajectory based on the perception data captured by one or more sensors or/and perception data accessed from the database. As an example and not by way of limitation, the AV 101A may use one or more sensors to capture the perception data (e.g., center lanes 105, the driving lane 106A and the opposite lane 106B, road boundaries 109A and 109B, a roadside vehicle 103A, a nearby vehicle 103B, etc.) of the surrounding environment and algorithmically generate a heuristic-based trajectory 107 to navigate the AV 101A in accordance with the current scenario of the surrounding environment. The AV 101A driving in the lane 106A may normally try to stay in the center of the lane 106A. When a roadside vehicle 103 is perceived on the roadside 102 based on the perception data, the AV 101A may generate the heuristic-based trajectory 107 and navigate based on the heuristic-based trajectory 107 to keep a safety distance 104 with respect to the roadside vehicle 103. Using the heuristic-based trajectory 107, the AV 101A may first steer toward the center lines 105 and then steer back to the center of the lane 106A to keep the safety distance 104 to the roadside vehicle 103A and avoid potential collisions. In this disclosure, the term "heuristic-based trajectory" may refer to a trajectory that is generated by one or more algorithms using one or more rules (e.g., heuristic rules) for navigating an AV in accordance with a scenario in the surrounding environment. As will be described later, a heuristic-based trajectory may be different from a human-driven trajectory in one or more aspects. In this disclosure, the term "human-like trajectory" may refer to trajectories that are generated by modifying the heuristic-based trajectories to be more similar to the human-driven trajectories. Traditional AVs may generate these heuristic-based trajectories and navigate based on these heuristic-based trajectories (without generating human-like trajectories by modifying the driving characteristics of the heuristic trajectories, as will be discussed later in this disclosure). In particular embodiments, AVs may generate heuristic-based trajectories, generate human-like trajectories by modifying the heuristic-based trajectories and navigate in the corresponding surrounding environments using the human-like trajectories.

Figure 1B:
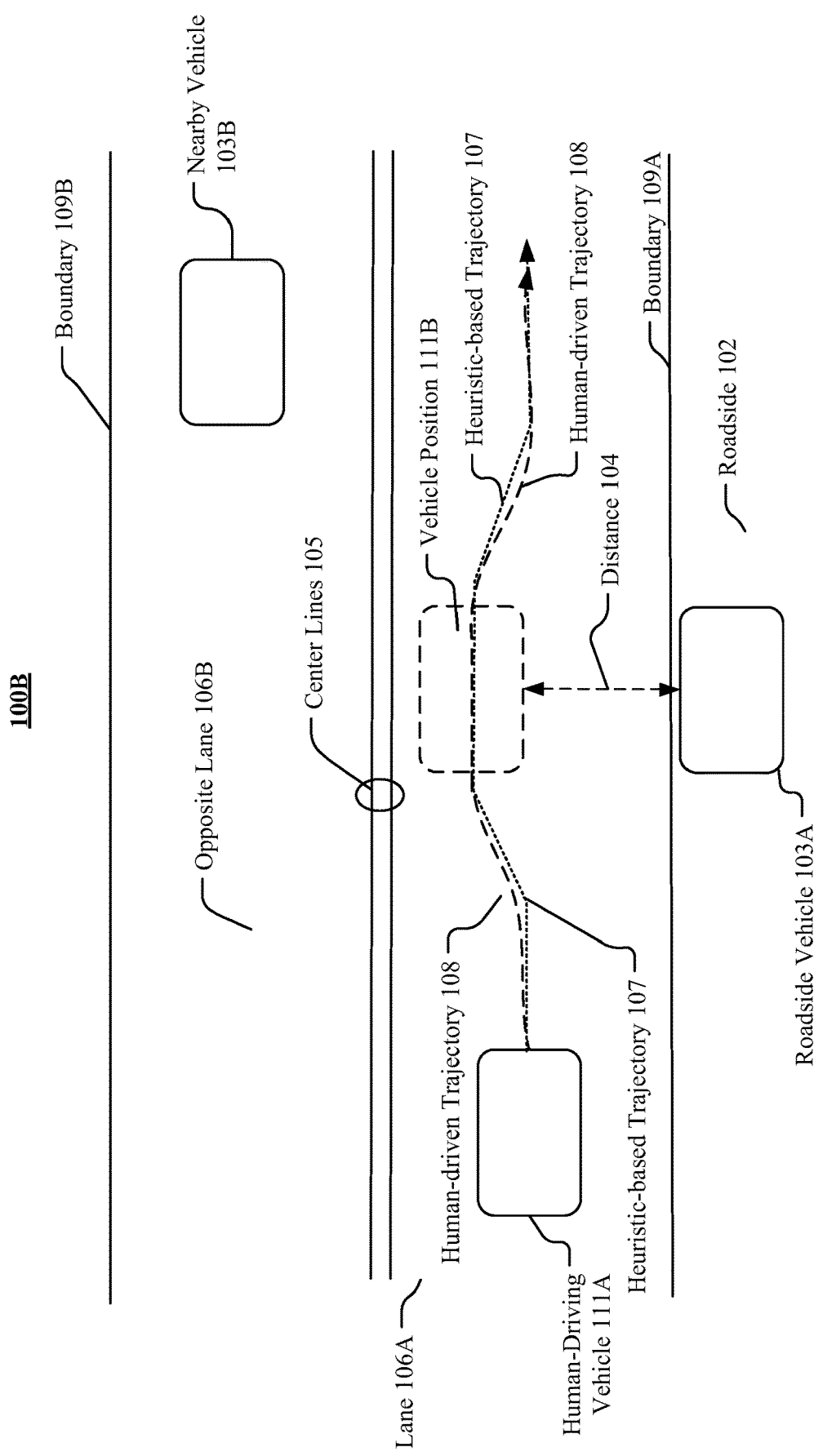
FIG. 1B illustrates an example human-driven trajectory for navigating a vehicle in a surrounding environment.

FIG. 1B illustrates an example human-driven trajectory 108 for navigating a vehicle in a surrounding environment 100B. In this disclosure, the term "human-driven trajectory" (denoted by H) or "human-generated trajectory" may refer to observed navigation trajectories of vehicles that are driven by human drivers. A human-driven trajectory may be determined based on the human-driving data (e.g., GSP data, vehicle positions, steering angles, acceleration, velocity, etc.) of vehicles that are driven by human drivers. As an example and not by way of limitation, a human-driving vehicle 111A may navigate in a surrounding environment 100B (which may have the same or similar scenario with respect to the surrounding environment 100A). The human-driving vehicle 111A driving in the lane 106A may normally try to stay in the center of the lane 106A. When the human driver perceives the roadside vehicle 103 the roadside 102, the human driver may first steer the vehicle toward the center lines 105 to keep the safety distance 104 to the roadside vehicle 103A and avoid potential collisions and then, steer back to the center of the lane 106A. The moving path of the human-driving vehicle may be illustrated by the human-driven trajectory 108.

In particular embodiments, a heuristic-based trajectory for navigating an AV in accordance with a particular scenario encountered by the AV in the surrounding environment may be different in one or more aspects from a human-driven trajectory for navigating a human-driving vehicle in accordance with the same scenario encountered in the surrounding environment. In particular embodiments, the difference between the heuristic-based trajectory and the corresponding human-driven trajectory may be related to one or more parameters or one or more parameter distributions related to, for example but not limited to, a vehicle moving path (e.g., of a lane changing process, a merging process, a braking process, a starting process, a turning process, a yielding process), a vehicle location at a particular time moment, a velocity at a particular time moment, a turning radius, a steering direction, an acceleration along the moving path, an acceleration along the lateral direction of the moving path, a parameter distribution over the moving path, a parameter distribution over time, a lack of acceleration, etc. As an example and not by way of limitation, the heuristic-based trajectory 107 may have a more aggressive turning process (e.g., with a smaller turning radius) when steering the AV 101A toward the center line 105 than the human-driven trajectory 108. As a result, the heuristic-based trajectory 107 may provide less optimal riding experience for the passengers even though it is technically correct and safe to be used to navigate the AV in accordance with this scenario. As another example and not by way of limitation, a heuristic-based trajectory may have a more aggressive acceleration process (e.g., greater acceleration values) when starting from a stop sign or a traffic signal than a corresponding human-driven trajectory. As another example and not by way of limitation, a heuristic-based trajectory may have a more aggressive deacceleration process (e.g., greater deacceleration values) when stopping for a stop sign or a traffic signal than a corresponding human-driven trajectory. As another example and not by way of limitation, a heuristic-based trajectory may have a different parameter distribution (e.g., an acceleration distribution, a velocity distribution, a distribution of a distance to a road edge or a center line) over the moving path of the heuristic-based trajectory with respect to a corresponding human-driven trajectory. As another example and not by way of limitation, a heuristic-based trajectory may have a different parameter distribution (e.g., an acceleration distribution, a velocity distribution, a distribution of a distance to a road edge or a center line) over time in the time window of the heuristic-based trajectory with respect to a corresponding human-driven trajectory.

Figure 1C:
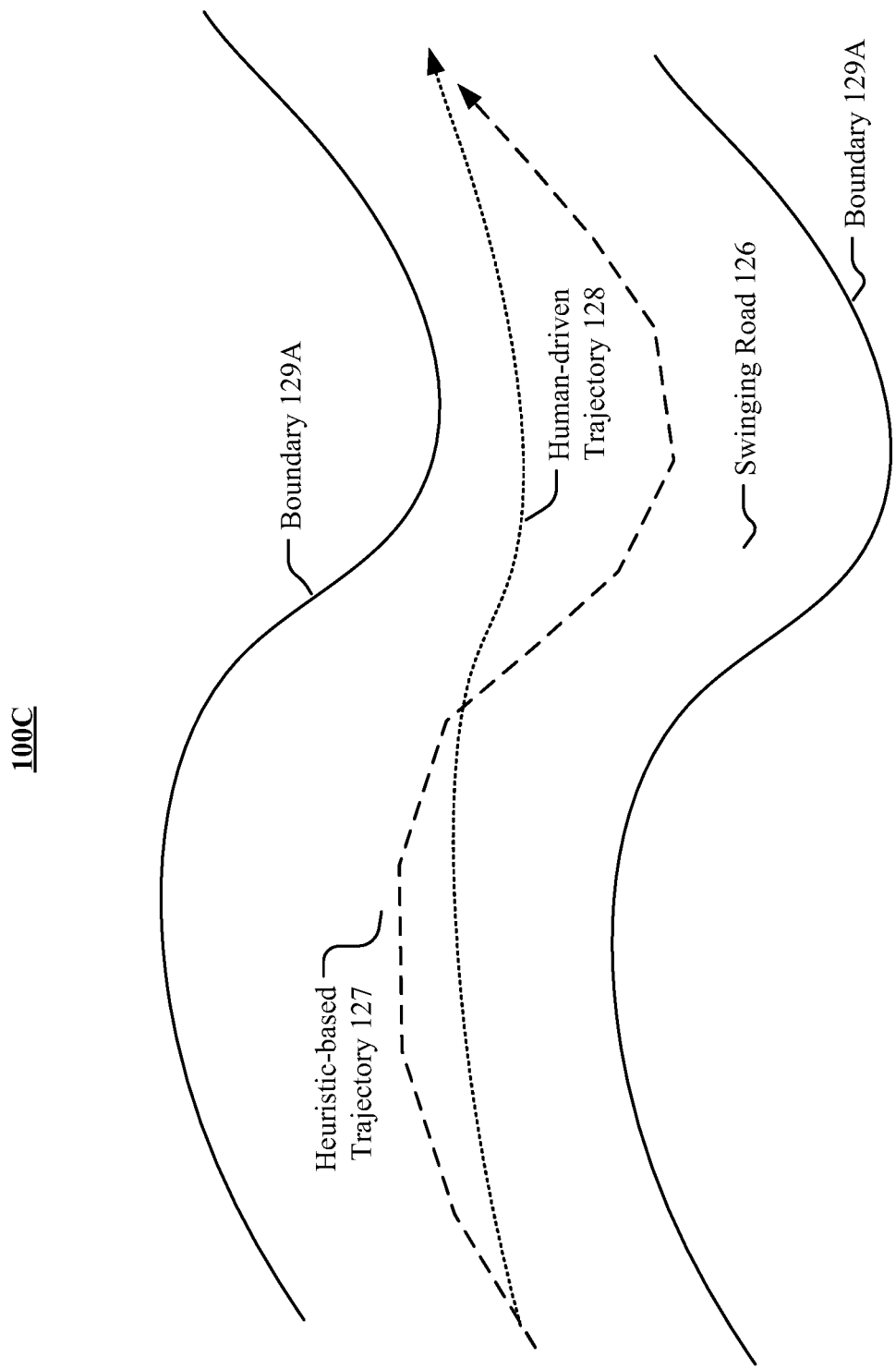
FIG. 1C illustrates an example heuristic-based trajectory and a corresponding human-driven trajectory for navigating respective vehicles along a swinging road.

FIG. 1C illustrates an example heuristic-based trajectory 127 and a corresponding human-driven trajectory 128 for navigating respective vehicles along a swinging road. As an example and not by way of limitation, for navigating along a zigzag or swinging road 126 (e.g., a one-way S-shape road), an AV may generate (e.g., using a motion planning algorithm) a heuristic-based trajectory 127 which tries to keep the AV at the center line of the swinging road 126 (e.g., having approximately equal distances to the two boundaries of 129A and 129B). In contrast, a human driver may take some short cuts and navigate the vehicle using the trajectory 128 (instead of keeping the vehicle at the center line of the swinging road 126). While both trajectories are technically correct and safe for navigating vehicles in this scenario, the AV as navigated based on the heuristic-based trajectory 127 may have a greater lateral acceleration and may swing back and force along the center line of the swinging road 126. As a result, the AV navigated based on the heuristic-based trajectory 127 may provide a less optimal riding experience than the vehicle driven by a human driver as navigated based on the human-driven trajectory 128.

Figure 1D:
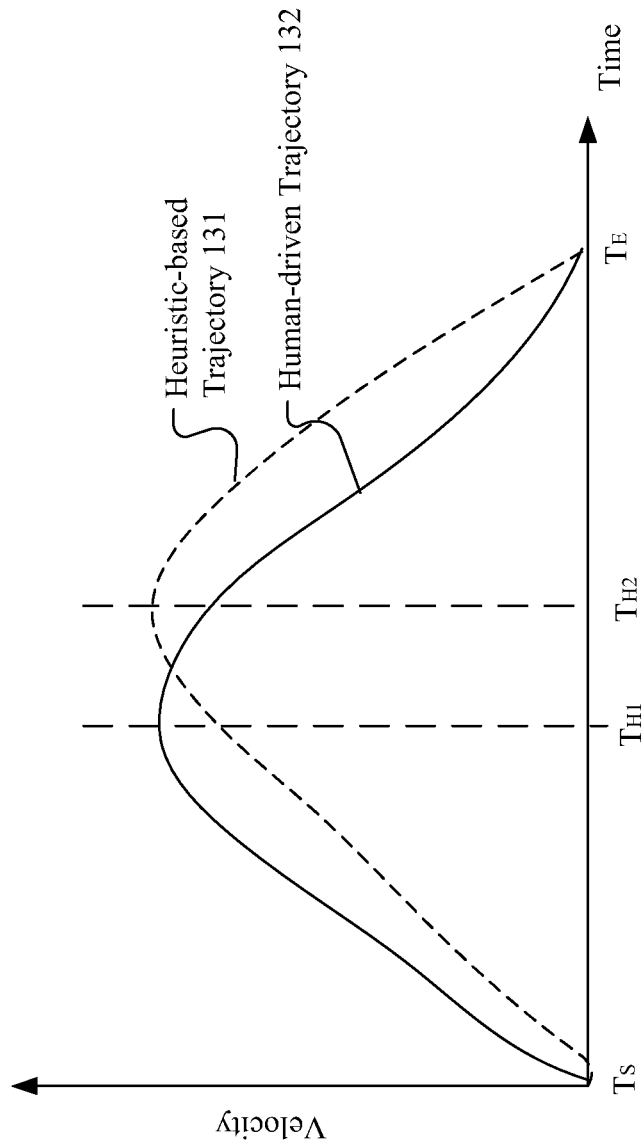
FIG. 1D illustrates example velocity distributions of a heuristic-based trajectory and a human-driven trajectory for an acceleration and deacceleration process.

FIG. 1D illustrates example velocity distributions of a heuristic-based trajectory and a human-driven trajectory for an acceleration and deacceleration process. As an example and not by way of limitation, the heuristic-based trajectory 131 may have a velocity distribution (over time) which is different from the velocity distribution (over time) of the human-driven trajectory 132, as shown in FIG. 1D. At the acceleration stage (e.g., from $T_5$ to $T_{H1}$), the human-driven trajectory 132 may have a higher velocity and a greater overall acceleration than the heuristic-based trajectory 131. At the deacceleration stage (e.g., from $T_{H2}$ to $T_E$), the human-driven trajectory 132 may have a lower velocity and a smaller overall deacceleration than the heuristic-based trajectory 131. As a result, the vehicle navigated based on the human-driven trajectory 132 may have a different vehicle position at a particular time moment with respect to the vehicle navigated based on the heuristic-based trajectory. The vehicle navigated based on the human-driven trajectory 132 may have a more aggressive acceleration process for starting the vehicle and a smoother deacceleration process for stopping the vehicle. As a result, the vehicle navigated based on the human-driven trajectory 132 may provide a better riding experience than the heuristic-based trajectory 131. It is notable that the velocity, acceleration and vehicle position parameters are for example purpose only and the difference between a heuristic-based trajectory and a corresponding human-driven trajectory is not limited thereto. For example, the difference between a heuristic-based trajectory and a corresponding human-driven trajectory may be associated with any suitable parameters associated with the vehicle trajectory.

Figure 1E:
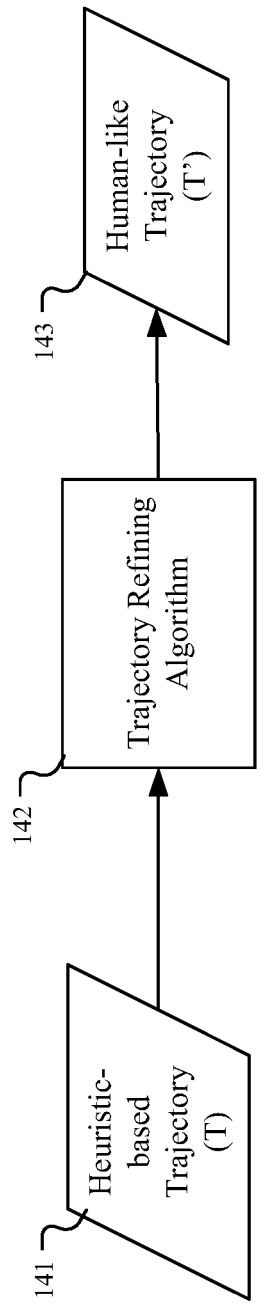
FIG. 1E illustrates an example process for generating human-like trajectories based on heuristic-based trajectories.

FIG. 1E illustrates an example process 100E for generating human-like trajectories based on heuristic-based trajectories. In particular embodiments, because AVs navigated based on heuristic-based trajectories may provide less optimal riding experience than human-driven vehicles, the computing system of the AV may use a trajectory generator to generate a human-like trajectory based on a heuristic-based trajectory to provide better riding experience for passengers. In particular embodiments, the system may use a computer algorithm to refine heuristic-based trajectories to make the heuristic-based trajectories to be more similar to human-driven trajectories to allow the AVs to provide more optimal riding experience. As an example and not by way of limitation, the system may use a trajectory refining algorithm 142 (also referred to as "human-like trajectory generator" or "trajectory generator") to refine a heuristic-based trajectory 141 (denoted by T) to generate a corresponding human-like trajectory 143 (denoted by T') to provide more optimal riding experience. The trajectory refining algorithm 142 may refine the heuristic-based trajectory 141 by adjusting one or more parameters or one or more parameter distributions of the heuristic-based trajectory 141 to make it more similar to human-driven trajectories. The human-like trajectory 143 generated by the trajectory refining algorithm 142 may be more similar to a corresponding human-driven trajectory (for navigating vehicles in accordance with the same scenario of the same surrounding environment) than the heuristic-based trajectory 141 and may provide a riding experience that is more similar to human-driven vehicles than the AVs navigated based on the heuristic-based trajectory 141. For example, the human-like trajectory 143 may have a less aggressive or more aggressive acceleration profile for the vehicle starting process from a stop sign than the heuristic-based trajectory 141. As another example, the human-like trajectory 143 may have a different moving path with respect to the heuristic-based trajectory 141. As yet another example, the human-like trajectory 143 may have a different parameter distribution (over the vehicle moving path or overtime) with respect to the heuristic-based trajectory 141.

Figure 1F:
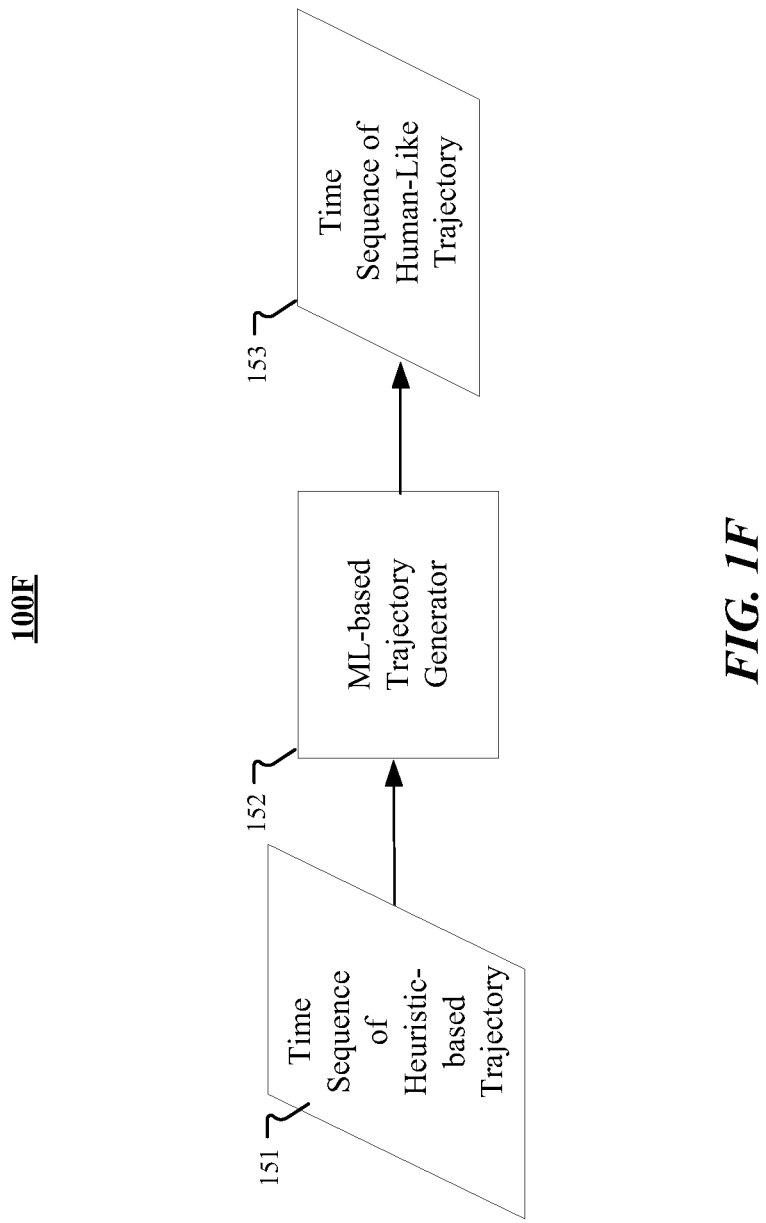
FIG. 1F illustrates an example process using a ML-based trajectory generator to generate human-like trajectories based on heuristic-based trajectories.

FIG. 1F illustrates an example process 100F using a ML-based trajectory generator to generate human-like trajectories based on heuristic-based trajectories. In particular embodiments, the trajectory refining algorithm used to generate human-like trajectories based on heuristic-based trajectories may be or include ML models (referred to as "ML-based trajectory generator") including, for example, but not limited to, a neural network, a temporal neural network (e.g., a recurrent neural network), a convolutional neural network, a deconvolutional neural network, a deep neural network, a variational autoencoder, etc. As an example and not by way of limitation, the system may use a ML-based trajectory generator 152 to generate a human-like trajectory 153 based on a heuristic-based trajectory 151. In particular embodiments, the ML-based trajectory generator 152 may take in the heuristic-based trajectory 151 in a time-sequence format and output the human-like trajectory 153 in a time-sequence format. The heuristic-based trajectory 151 in the time sequence format may include a series of data points in time domain. Each data point may be associated with a combination of a group of parameters and a particular time moment. For example, a data point of the heuristic-based trajectory 151 may be represented by a vector of (x, y, a, v, t), where x and y are spatial coordinates of the vehicle position at the time moment t, a is the acceleration of the vehicle at the time moment t, and v is the velocity of the vehicle at the time moment t. The ML-based trajectory generator 152 may receive the sequence of data points and determine the output sequence of data points for the human-like trajectory 153. A data point of the human-like trajectory 153 may be represented by a vector of (x', y', a', v', t), where x' and y' are spatial coordinates of the vehicle position at the time moment t, a' is the acceleration of the vehicle at the time moment t, and v' is the velocity of the vehicle at the time moment t.

Alternatively, in particular embodiments, a data point of the heuristic-based trajectory 151 may be represented by a vector of (x, y, d, a_lateral, a_longitudinal, β, t), where x and y are spatial coordinates of the vehicle position at the time moment t, d is the vehicle moving direction or heading direction at the time moment t, a_lateral is the lateral acceleration of the vehicle at the time moment t, a_longitudinal is the longitudinal acceleration along the moving path of the vehicle, and β is the steering angle of the vehicle at the time moment t. The ML-based trajectory generator 152 may receive the sequence of data points and determine the output sequence of data points for the human-like trajectory 153. A data point of the human-like trajectory 153 may be represented by a vector of (x', y', d', a'_lateral, a'_longitudinal, β', t), where x' and y' are spatial coordinates of the vehicle position at the time moment t, d' is the vehicle moving direction or heading direction at the time moment t, a'_lateral is the lateral acceleration of the vehicle at the time moment t, a'_longitudinal is the longitudinal acceleration along the moving path of the vehicle, and β' is the steering angle of the vehicle at the time moment t. It is notable that, even though the data point of the trajectory time sequence may be represented by different vectors (including different parameters), these vectors may include the same information and the vectors for representing the same data point may be converted into each other mathematically. In particular embodiments, the trajectory refining algorithm may be or include a rule-based computer algorithm. The rule-based computer algorithm may determine the parameter distribution of the heuristic-based trajectory, adjust one or more parameters or parameter distributions of the heuristic-based trajectory, and generate the corresponding human-like trajectory.

Figure 1G:
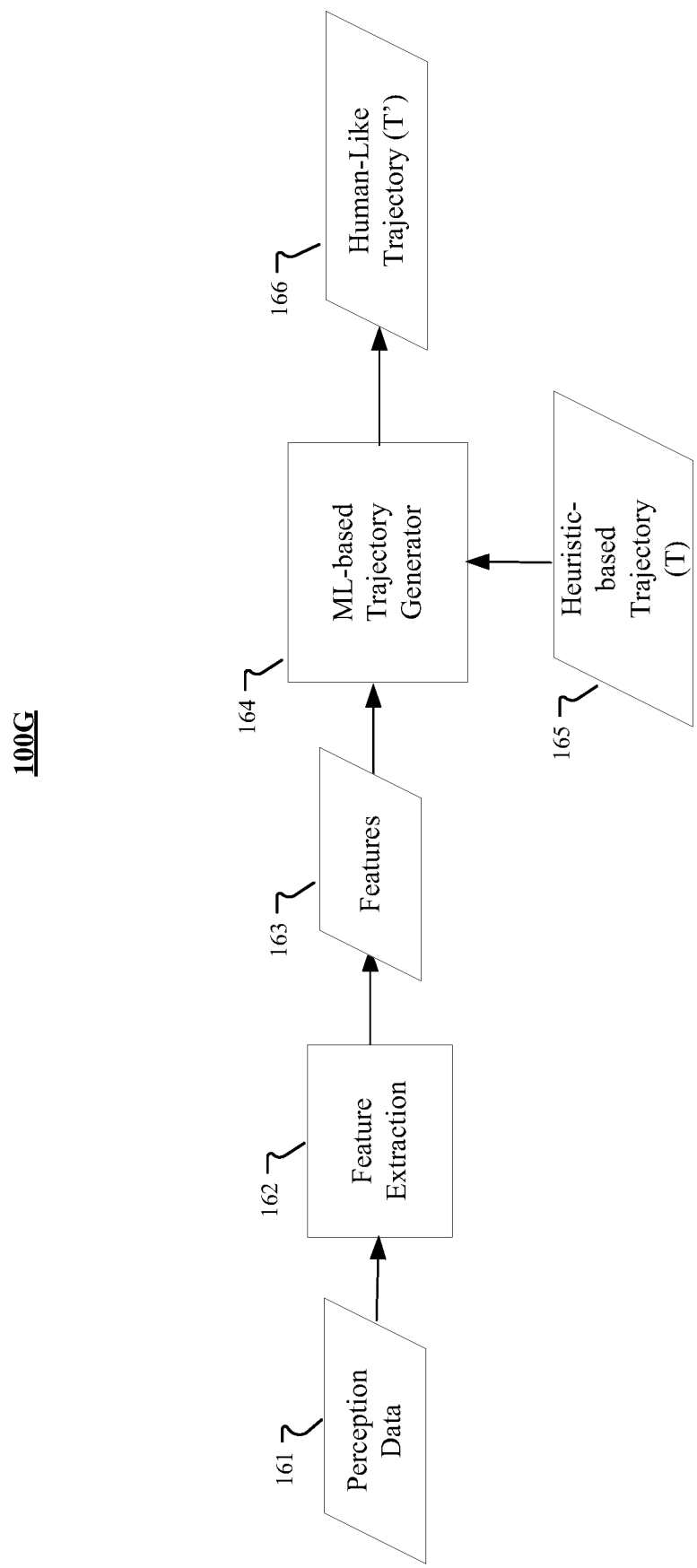
FIG. 1G illustrates an example process for using a ML-based trajectory generator to generate human-like trajectories based on heuristic-based trajectories and related contextual data.

FIG. 1G illustrates an example process 100G for using a ML-based trajectory generator to generate human-like trajectories based on heuristic-based trajectories and related contextual data. In particular embodiments, in addition to receiving the heuristic-based trajectory 165 in a time sequence format, the ML-based trajectory generator 164 may receive and use contextual information determined based on perception data of the surrounding environment to generate the human-like trajectory. As an example and not by way of limitation, the system may capture the perception data 161 of the surrounding environment using one or more sensors or access the perception data 161 of the surrounding environment from a database. The system may use a feature extraction algorithm 162 (e.g., a pattern recognition algorithm, an object recognition algorithm) to extract features or objects 163 of the surrounding environment based on the perception data 161. The extracted features or objects 163 of the surrounding environment may be associated with the moving path of the heuristic-based trajectory and may include, for example, but are not limited to, a road lane, a road boundary, a center line, an obstacle, a nearby vehicle, a pedestrian, a stop sign, a traffic signal, etc.

In particular embodiments, the ML-based trajectory generator 164 may receive these features 163 and the heuristic-based trajectory 165 (e.g., in a time sequence format). The ML-based trajectory generator 164 may adjust one or more parameters or one or more parameter distributions of the heuristic-based trajectory 165 based on one or more features 163 to generate the human-like trajectory 166. In particular embodiments, the perception data 161 of the surrounding environment may include one or more images (e.g., raster images, RGB images), LiDAR data, map data, radar data, etc. As an example and not by way of limitation, the features received by the ML-based trajectory generator 164 may include the boundary lines of the road on which the vehicle is navigated. The ML-based trajectory generator 164 may determine the distances of the vehicle to the boundary lines according to the heuristic-based trajectory 165 and adjust the distance values of the vehicle to the boundary lines or adjust the distance distribution (over the moving path or over time) of the heuristic-based trajectory 165 to generate the human-like trajectory 166. As a result, the human-like trajectory 166 may have a different moving path with respect to the heuristic-based trajectory 165 and may provide riding experience that is more similar to human-driven trajectories. In particular embodiments, the ML-based trajectory generator 164 may receive heuristic-based trajectories that are represented by images. As an example and not by way of limitation, a heuristic-based trajectory may be represented by one or more raster images including the moving path of the vehicle including a series of data points. Each data point may be associated with a number of parameters (e.g., vehicle coordinates, vehicle velocity, vehicle acceleration, etc.) and a time moment. The ML-based trajectory generator 164 may receive heuristic-based trajectories as represented by the raster images of the scene and output a sequence of data points for the corresponding human-like trajectories.

Figure 2A:
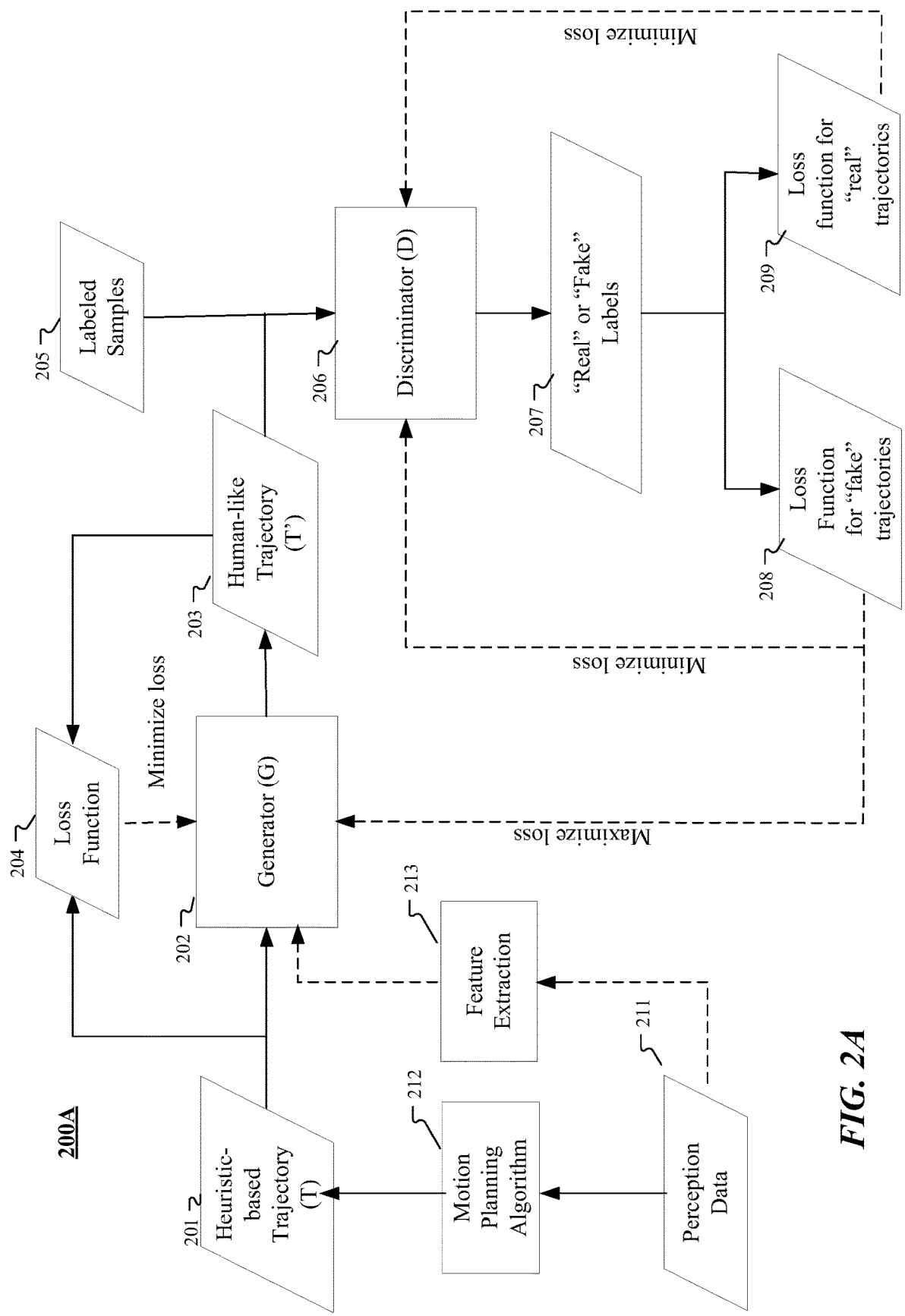
FIG. 2A illustrates an example framework for training the machine-learning-based trajectory generator using an adversarial network (GAN).

FIG. 2A illustrates an example framework 200A for training the machine-learning-based trajectory generator using an adversarial network (GAN). In particular embodiments, the ML-based trajectory generator for generating human-like trajectories may correspond to the generator 202 (denoted by G) of the GAN framework 200A and may be trained within the GAN framework 200A. At a high level, the GAN framework 200A may include two machine-learning models (e.g., neural networks): the generator 202 (denoted by G) and the discriminator 206 (denoted by D). The system may use a motion planning algorithm 212 to generate a heuristic-based trajectory 201 based on the perception data 211 of the surrounding environment. The generator 202 may generate the human-like trajectory 203 based on the heuristic-based trajectory 201. In particular embodiments, the generator 202 may generate the human-like trajectory 203 based on the heuristic-based trajectory 201 and the features or objects of the surrounding environment determined by the feature extraction algorithm 213 based on the perception data 211. The discriminator 206 may be tasked to discriminate human-driven trajectories and non-human-driven trajectories (e.g., algorithmically generated heuristic-based trajectories, algorithmically generated human-like trajectories). In this disclosure, the trajectories that are generated based on the human-driving data and used by human drivers to navigate vehicles may be referred to as "real human-driven trajectories". The trajectories that are generated by computer algorithms (e.g., algorithmically generated heuristic-based trajectories or algorithmically generated human-like trajectories) based on the perception data of the surrounding environment may be referred to as "fake human-driven trajectories". The discriminator 206 may discriminate real/fake human-driven trajectories by determining a probability value for each input trajectory indicating a probability level of that input trajectory to be a real or fake human-driven trajectory. During the training process, the generator 202 may be optimized based on: (1) a first loss function 204 which compares the heuristic-based trajectory 201 (denoted by T) to the corresponding human-like trajectory 203 (denoted by T') generated by the generator 202; and (2) a second loss function 208 associated with the discriminator 206 for determining the loss values for fake human-driven trajectories. The generator 202 may be optimized to generate human-like trajectories 202 that are more similar to human-driven trajectories and try to fool the discriminator 206 to classify the human-like trajectories as real human-driven trajectories. On the other hand, the discriminator 206 may be optimized based on the loss functions 208 and 209 for fake and real human-driven trajectories, respectively, to more accurately discriminate real/fake human-driven trajectories.

In particular embodiments, the discriminator 206 may be pre-trained using a supervised training process based on labeled training samples 205. The labeled training samples 205 may include labeled real human-driven trajectories and labeled fake human-driven trajectories. These real/fake human-driven trajectories may be associated with different scenarios that are encountered by vehicles in the surrounding environment. The information related to the scenarios and the surrounding environment may be used to select trajectories associated with particular scenarios to feed to the GAN framework for training the discriminator. The information related to the scenarios and the surrounding environment may include GPS data. During the supervised training process, the labeled real/fake human trajectories of the labeled training samples 205 may be fed to the discriminator 206. The discriminator 206 may discriminate or classify the input trajectories based on the current model parameter values (e.g., neural network weight values). The discriminator 206 may use the current parameter values (e.g., neural network weight values) to determine, for each input trajectory, a first probability value $P_R$ indicating a probability level of that input trajectory to be a real human-driven trajectory. The discriminator 206 may determine a second probability value $P_F=1-P_R$ indicating a probability level of that input trajectory to be a fake human-driven trajectory. The discriminator 206 may compare the first probability value $P_R$ to a pre-determine threshold (e.g., 0.5) and may classify the input trajectory as a real human-driven trajectory when $P_R$ is greater than the pre-determined threshold value (e.g. 0.5). The discriminator 206 may classify the input trajectory as a fake human-driven trajectory when $P_R$ is smaller than or equal to the pre-determined threshold value (e.g. 0.5). The discriminator 206 may output a "Real" or "Fake" label 207 (e.g., 1 for "Real", 0 for "Fake") to be associated with the input trajectory and use the loss functions 208 and 209 to determine the corresponding loss values based on the corresponding probability values.

In particular embodiments, the discriminator 206 may use the loss function 209 to calculate loss values for real human-driven trajectories (e.g., pre-labeled real human-driven trajectories included in the labeled training samples 205). The discriminator 206 may use the loss function 209 to calculate the loss value for a prediction or classification for an input trajectory that is pre-labeled as a real human-driven trajectory using the following equation:

$$\Delta_{Loss\_Real} = 1 - P_R \quad (1)$$

where, $P_R$ is the probability value for the input trajectory to be a real human-driven trajectory as determined by the discriminator 206 based on the current parameter values, $\Delta_{Loss\_Real}$ is the loss value for this prediction or classification. The loss value $\Delta_{Loss\_Real}$ as determined by Equation (1) may indicate a difference (or an error) between the calculated probability value $P_R$ for the associated trajectory to be a real human-driven trajectory and the ideal probability value of 1 which corresponds to a probability of 100%. Similarly, the loss function 208 used by the discriminator 206 for calculating loss values for pre-labeled or known fake human-driven trajectories may calculate the loss value for a prediction or classification of an input trajectory that is pre-labeled as or known to be a fake human-driven trajectory using the following equation:

$$\Delta_{Loss\_Fake} = 1 - P_F = 1 - (1 - P_R) = P_R \quad (2)$$

where, $P_F$ is the probability value for the input trajectory to be a fake human-driven trajectory as determined by the discriminator 206 based on the current parameter values, $P_R$ is the probability value for the input trajectory to be a real human-driven trajectory as determined by the discriminator 206 based on the current parameter values, $\Delta_{Loss\_Fake}$ is the loss value for this prediction. The loss value $\Delta_{Loss\_Fake}$ as determined by Equation (2) may indicate a difference (or an error) between the calculated probability value $P_F$ for the associated trajectory to be a fake human-driven trajectory and the ideal probability value of 1 which corresponds to a probability of 100%. In particular embodiments, instead of using Equations (1) and (2) to calculate the loss values for corresponding predictions, the system may use a binary cross-entropy function (e.g., a Log-loss function) as the loss functions to calculate the loss values for the predictions or classifications using the following equations:

$$\Delta_{Loss\_Real} = -\log(1-P_R) \quad (3)$$

$$\Delta_{Loss\_Fake} = -\log(P_R) \quad (4)$$

In particular embodiments, during the pre-training process for the discriminator 206, the discriminator 206 may adjust one or more of the model parameters (e.g., ML model weights) in a way that will minimize the loss values as determined by the loss functions 208 and 209. For example, for a particular input trajectory that is pre-labelled as a real human-driven trajectory, the discriminator 206 may correctly classify that input trajectory into "real" category or incorrectly classify that input trajectory into "fake" category based on the current model parameter values. The discriminator 206 may calculate the loss value for this prediction or classification using the loss function 209 (e.g., as described in Equation (1) or (3)) and feed the calculated loss value back to the discriminator 206. The discriminator 206 may be optimized (e.g., by an optimization algorithm) to adjust one or more of its parameters to minimize the loss value. As another example, for a particular input trajectory that is pre-labelled as a fake human-driven trajectory, the discriminator 206 may correctly classify that input trajectory into the "fake" category or incorrectly classify that input trajectory into the "real" category based on the current model parameter values. The discriminator 206 may calculate the loss value for this prediction or classification using the loss function 208 (e.g., Equation (2) or (4)) and feed the calculated loss value back to the discriminator 206. The discriminator 206 may be optimized (e.g., by an optimization algorithm) to adjust one or more of its parameters to minimize the loss value. After the discriminator 206 is pre-trained to a certain level (e.g., the classification correctness rate being higher than a pre-determined threshold), the discriminator 206 may be used in the GAN framework 200A to discriminate the human-like trajectories 203 generated by the generator 202.

In particular embodiments, the generator 202 may generate the human-like trajectory 203 based on the heuristic-based trajectory 201 which is generated by the motion planning algorithm 212 based on the perception data 211. The generator 202 may refine the heuristic-based trajectory 201 by adjusting one or more parameters or one or more parameter distributions of the heuristic-based trajectory 201 to make it more similar to human-driven trajectories. In particular embodiments, the generator 202 may generate the human-like trajectory 203 based on the heuristic-based trajectory 201 and one or more features or objects of the surrounding environment as determined by the feature extraction algorithm 213 based on the perception data 211. The generator 202 may refine the heuristic-based trajectory 201 by adjusting one or more parameters or parameter distributions of the heuristic-based trajectory 201 based on one or more features (e.g., road lanes, road boundaries, road signs, traffic signals, etc.) or objects of the surrounding environment. In particular embodiments, the human-like trajectory 203 may be different from the heuristic-based trajectory 201 in one or more aspects related to one or more parameters or parameter distributions. For example, the human-like trajectory 203 may have a less aggressive deacceleration process when slowing down and stopping the vehicle for a stop sign. As another example, the human-like trajectory 203 may have a moving path that is more similar to a human-driven trajectory than the heuristic-based trajectory 201 (e.g., as illustrated in FIG. 1C).

However, in some scenarios, the human-like trajectory 203 could deviate from the heuristic-based trajectory 201 too far and that would cause some problems. For example, if the human-driven trajectory 203 has a moving path that deviates from the moving path of the heuristic-based trajectory 201 and the difference is greater than a pre-determined threshold range, the human-driven trajectory 203 may not meet the safety criteria for navigating the vehicle (e.g., by being too close to an obstacle in the surrounding environment). As another example, if the generator 202 repeatedly generates a same or similar human-like trajectory that is very different from the input heuristic-based trajectories but can successfully fool the discriminator 206 during the training process, the generator 202 may appear to have met the training target (e.g., successfully fooling the discriminator 206) while actually have a modal collapse failure.

To solve these problems, particular embodiments of the system may use the loss function 204 to apply constraints on the training process of the generator 202. The constraints may require the human-like trajectory 203 generated by the generator 202 to be as close as possible to the corresponding heuristic-based trajectory 201 being fed to the generator 202. In particular embodiments, the loss function 204 may determine the loss value by comparing the human-like trajectory 203 to the corresponding heuristic-based trajectory 201 using the following equation:

$$\Delta_{Loss\_Trajectory} = \|T - T'\| \quad (5)$$

where, T is the heuristic-based trajectory being fed to the generator 202, T' is the corresponding human-like trajectory generated by the generator 202. In particular embodiments, during the training process for training the generator 202 using the GAN framework 200A, the generator 202 may generate the human-like trajectory 203 by refining the heuristic-based trajectory 201 and determine the loss value for this generating process (or may be referred to as a prediction process) using the loss function 204 as described by Equation (5). Then, the system may feed the loss value to the generator 202 which may be optimized (e.g., by an optimization algorithm) to adjust the values of one or more of model parameters in a way that will minimize the loss value.

In particular embodiments, during the process for training the generator 202 using the GAN framework 200A, the system may feed the human-like trajectory 203 to the discriminator 206. The discriminator 206 may classify the human-like trajectory 203 based on the current model parameter values of the discriminator 206. The discriminator 206 may output a "Real" or "Fake" label 107 for the human-like trajectory 203 based on the current model parameters values of the discriminator 206. For example, the discriminator 206 may correctly classify the human-like trajectory 203 as a fake human-driven trajectory or incorrectly classify the human-like trajectory 203 as a real human-driven trajectory. In either scenario, the discriminator 206 may determine a probability value $P_R$ indicating a probability level for the input human-like trajectory 203 be a real human-driven trajectory and a probability value $P_F = 1 - P_R$ indicating a probability level for the input human-driven trajectory 203 to be a fake human-driven trajectory. Since the human-like trajectory 203 is known to be a fake human-driven trajectory, the discriminator 206 may determine a loss value for this prediction or classification based using the loss function 208 for fake human-driven trajectory. Then, the system may feed the loss value as determined by the loss function 208 to the generator 202 to optimize the generator 202. The generator 202 may be optimized (e.g., by an optimization algorithm) to adjust one or more model parameters (e.g., neural network weights) in a way that will maximize the loss value as determined by the loss function 208.

As described in the earlier sections (e.g., Equations (2) and (4)) of this disclosure, the loss value for fake human-driven trajectories may equal to or correspond to the probability value indicating the probability level of the input human-like trajectory 203 to be a real human-driven trajectory (e.g., $\Delta_{Loss\_Fake} P_R$), as determined by Equation (2) or $\Delta_{Loss\_Fake} = -\log(P_R)$ as determined by Equation (4)). Therefore, maximizing the loss value for the fake human-driven trajectory may maximize the probability value for the input human-like trajectory to be a real human-driven trajectory. In other words, the loss value as determined by the loss function 208 of the discriminator 206 may be fed back to the generator 202 to cause the generator 202 to be optimized by adjusting one or more model parameters in a way that will maximize the probability value that the human-like trajectory 203 would be classified as a real human-driven trajectory by the discriminator 206. Therefore, after the parameters of the generator 202 have been adjusted in each iteration of the training process, the generator 202 may generate subsequent human-like trajectories that would be more likely to fool the discriminator 206 by causing the discriminator 206 to classify these human-like trajectories as real human-driven trajectories.

In particular embodiments, the loss value as determined by the loss function 208 for the human-like trajectory 203 (which is a fake human-driven trajectory) may be fed back to the discriminator 206 to cause the discriminator 206 to be optimized based on this loss value. The discriminator 206 may be optimized (e.g., by an optimization algorithm) to adjust one or more model parameters (e.g., neural network weights) in a way that would minimize the loss value for this prediction or classification as determined by the loss function 208. In other words, the discriminator 206 may be optimized to minimize the probability value indicating the probability level for the human-like trajectory 203 to be a real human-driven trajectory (because the human-like trajectory 203 is known to be a fake human-driven trajectory). As a result, the discriminator 206 may be optimized in each iteration of the training process to more accurately discriminate real/fake human-driven trajectories.

In particular embodiments, the discriminator 206 may determine a similarity metric for each input trajectory with respect to one or more observed human-driven trajectories (e.g., stored in a database). The similarity metric may be determined based on a comparison of: one or more driving characteristics, one or more trajectory parameter values, one or more trajectory parameter distributions (e.g., over the moving path or over time), one or more trajectory parameter profiles, or a combination of thereof. The discriminator 206 may compare the similarity metric of the input trajectory to a pre-determined similarity threshold. In response to the similarity metric satisfying the similarity threshold, the discriminator 206 may identify that input trajectory as a real human-driven trajectory. In response to the similarity metric failing to satisfy the similarity threshold, the discriminator 206 may identify that input trajectory as a fake human-driven trajectory. Since whether the input trajectory (e.g., a human-like trajectory generated by the generator 202 or a labeled trajectory from the labeled sample 205) is a real human-driven trajectory is known to the system, the discrimination result may be compared with that known trajectory status (e.g., real or fake) and may be fed back to the discriminator 206 through the corresponding loss function to optimize the discriminator 206.

In particular embodiments, the generator 202 and discriminator 206 may be trained in turn using different training processes. For example, the system may first train the discriminator 206 during a supervised learning process (similar to the pre-training process as described in earlier sections of this disclosure) using a group of pre-labeled real and fake human-driven trajectories. Then, the system may train the generator 202 by feeding a group of heuristic-based trajectories 201 to the generator 202, causing the generator 202 to generate human-like trajectories 203, adjusting one or more parameters of the generator 202 based on the loss function 204, feeding the human-like trajectories 203 to the discriminator 206, and adjusting one or more parameters of the generator 202 based on the loss function 208 of the discriminator 206. The generator 202 may be evaluated to check whether it meets the criteria of successfully fooling the discriminator 206. Then, the system may repeat the supervised learning process for training the discriminator 206 using another group of pre-labeled real and fake human-driven trajectories and repeat the training process for the generator 202 using another group of heuristic-based trajectories 201. These training processes may be repeated and the generator 202 and discriminator 206 may be trained in turn back and force until the generator 202 meets pre-determined training criteria.

In particular embodiments, the system may train the generator 202 and the discriminator 206 simultaneously in the same training process (e.g., in different sub-steps of the same process) using a same batch of training samples. For example, the system may store a large number of heuristic-based trajectories and a large number of human-driven trajectories in a database. The heuristic-based trajectories and the human-driven trajectories may be organized into a number of batches (also referred to as mini batches). Each batch of the training samples may include N number of heuristic-based trajectories (e.g., N=10) and M number of human-driven trajectories (e.g., M=10). During the training process, the system may access and retrieve a batch of training samples from the database and use the M number of human-driven trajectories to train the discriminator 206 which may be optimized by adjusting one or more model parameters based on the loss function 209 for real human-driven trajectories. The model parameters of the discriminator 206 may be adjusted in a way to minimize the loss values as determined based on the loss function 209 for the real human-driven trajectories. The discriminator 206 with the adjusted model parameters may discriminate real/fake human-driven trajectories more accurately (e.g., with a higher correctness rate).

As the same time, the system may feed the N number of heuristic-based trajectories of the same batch to the generator 202. The generator 202 may generate the corresponding human-like trajectories 203 based on the heuristic-based trajectories 202 that are fed to the generator 202 (or further based on the features or objects as determined by the feature extraction algorithm 213 based on the perception data 211 of the surrounding environment). The system may optimize the generator 202 by adjusting its model parameters to minimize the loss values as determined based on the loss function 204. Then, the system may feed the human-like trajectories 203 that are generated by the generator 202 to the discriminator 206. The discriminator 206 may classify or discriminate the input human-like trajectories based on current model parameter values and output the "Real" or "Fake" label for each of these input trajectories. The system may determine the loss values for this classifications or predictions using the loss function 208 since these human-like trajectories are known to be fake human-driven trajectories. Then, the system may feed the loss values as determined by the loss function 208 to the generator 202 and the discriminator 206. The generator 202 may be updated by adjusting its model parameters to maximize the loss values as determined by the loss function 208. And, at the same time, the discriminator 206 may be updated by adjusting its model parameters to minimize the loss values as determined by the loss function 208. As a result, the generator 202 and the discriminator 206 may be updated simultaneously in the same iteration process using the same batch of training samples. After both the generator 202 and the discriminator 206 are updated, the system may access a new batch of training samples and repeat the training process for another iteration. This training process may be repeated until the generator 202 meets pre-determined training objectives. In particular embodiments, using the GAN framework, the generator 202 and the discriminator 206 may be trained iteratively and incrementally.

In particular embodiments, the system may store a large number of human-driven trajectories and a large number of heuristic-based trajectories in a database as training samples. The human-driven trajectories and the heuristic-based trajectories may be organized into mini-batches with each batch including N number of heuristic-based trajectories and M number of human-driven trajectories. To ensure the quality of the training samples, the trajectories stored in the database may cover a number of representative scenarios that could possibly be encountered by vehicles in the surrounding environment and the human-driven trajectories that have unwanted characteristics (e.g., harsh braking, reckless driving, speeding, etc.) may be excluded. In particular embodiments, the trajectories may be associated with scenarios including, for example, but not limited to, lane keeping, lane merging, passing other vehicles, starting from a stop sign or traffic signal, stopping for a stop sign or a traffic signal, making a turn, yielding to other traffic, yielding to vehicles in roadside areas, navigating on a zigzag or swinging road, etc.

In particular embodiments, the ML-based trajectory generator may be a general ML model that is trained using training samples of all scenarios included an operation design domain. For example, the ML-based trajectory generator may be trained using training samples of each scenario of the operational design domain and may be evaluated to determine whether the training objectives are met per scenario. The ML-based trajectory generator, once trained, may process heuristic-based trajectories of any scenarios included in the operation design domain to generate corresponding human-like trajectories. In particular embodiments, instead of using a general ML-based trajectory generator for all scenarios, the system may use a number of ML-based trajectory generators each for a particular scenario (or a combination of multiple scenarios). The system may train a ML-based trajectory generator for a particular scenario using the training samples of that particular scenarios using the GAN framework. Once all ML-based trajectory generators meet the training objectives, they may be deployed to AVs to improve the riding experience. At run time, an AV with the ML-based trajectory generators may identify the current scenario that is encountered by the AV and select corresponding ML-based trajectory generator based on the current scenario. The AV may generate a heuristic-based trajectory and use the selected ML-based trajectory generator to refine the heuristic-based trajectory and generate the human-like trajectory to navigate the vehicle.

It is notable that using the GAN framework to train the ML-based trajectory generator may provide a number of advantages with respect to using other methods (e.g., VAE) to train the ML-based trajectory generator. For example, by using the GAN framework, the ML-based trajectory generator may be optimized based on the discrimination results of the discriminator with no need for directly comparing the generated human-like trajectories to the real human-driven trajectories. As another example, the GAN framework may allow the ML-based trajectory generator and the discriminator to be trained and optimized incrementally with many iterations. By incrementally optimizing the discriminator based on the loss functions for the fake/real human-driven trajectories, the discriminator may get better and better over time for discriminating the fake/real human-driven trajectories. By incrementally optimizing the ML-based trajectory generator to get better at fooling the discriminator, the ML-based trajectory generator may get better and better over time for generating human-like trajectories that are more similar to real human-driven trajectories. The incremental and iterative training process enabled by the GAN framework may provide an effective solution for training the ML-based trajectory generator without limitations on the amount of training data samples. For example, whenever new collected human-driving data of specific scenarios is made available, the data may be supplemented to the GAN framework to further train and optimize the ML-based trajectory generator for that scenario.

Figure 2B:
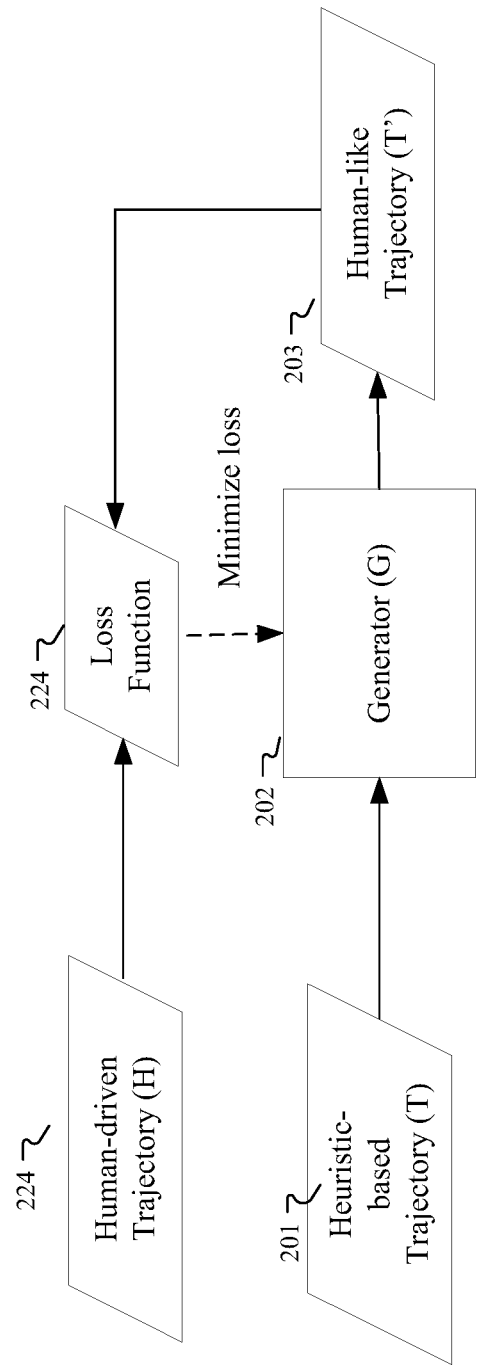
FIG. 2B illustrate an example process for training the machine-learning-based trajectory generator using a supervised learning process.

FIG. 2B illustrate an example process 200B for training the machine-learning-based trajectory generator using a supervised learning process. In particular embodiments, the ML-based trajectory generator (later referred to as "generator") for generating human-like trajectory may be trained in a supervised learning process using pre-generated training samples (e.g., heuristic-based and human-driven trajectory pairs). The heuristic-based trajectory and the corresponding human-driven trajectory in the same trajectory pair may be for navigating vehicles in accordance with the same scenario in the same surrounding environment. As an example and not by way of limitation, the system may access a number of heuristic-based and human-driven trajectory pairs (denoted by T-H pairs) from a database. The system may feed a heuristic-based trajectory 201 (denoted by T) to the generator 202 (denoted by D). The generator 202 may refine the heuristic-based trajectory 201 by adjusting one or more trajectory parameters or parameter distributions to generate the human-like trajectory 203 (denoted by T'). In particular embodiments, the system may further access the perception data of the surrounding environment associated with the heuristic-based trajectory 201, extract features (e.g., road lanes, traffic signs, etc.) of the surrounding environment and feed these extracted features to the generator 202. The generator 202 may refine the heuristic-based trajectory 201 based on the features of the surrounding environment to generate the human-like trajectory 203. Then, the system may determine a loss value based on the loss function 224 which may compare the human-like trajectory 203 to the corresponding human-driven trajectory 224 (e.g., of the same trajectory pair). The system may feed the loss value as determined by the loss function 224 to the generator 202 to cause the generator to be updated and optimized. The generator 202 may be optimized to adjust one or more model parameters to minimize the loss value as determined based on the loss function 224. This training process may be repeated until the generator 202 is trained to generate human-like trajectories 203 that meet pre-determined criteria.

In particular embodiments, the system may train the ML-based trajectory generator for generating human-like trajectories (later referred to as "generator) using a supervised learning process based on the pre-generated heuristic-based and human-driven trajectory pairs in addition to the training process using GAN. As an example and not by way of limitation, the system may access a number of heuristic-based and human-driven trajectory pairs from a database and use these trajectory pairs to train the generator 202 using a supervised learning process. The system may feed the heuristic-based trajectories 201 to the generator 202 to generate corresponding human-like trajectories 203 which will be fed to the discriminator 206 (as shown in FIG. 2A). The model parameters of the generator 202 may be updated or adjusted to minimize the loss values as determined by the loss function 224. At the same time, the model parameters of the generator 202 may be updated or adjusted to minimize the loss values as determined by the loss function 204 and to maximize the loss values as determined by the loss function 208, as described in earlier sections of this disclosure.

Figure 3A:
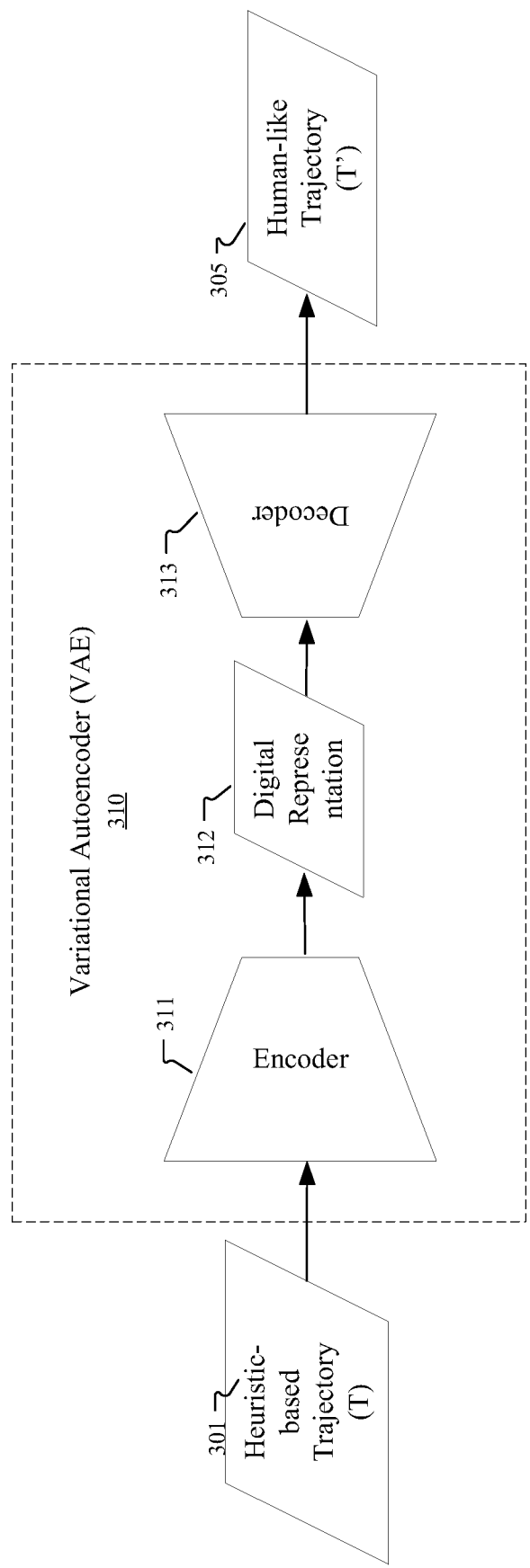
FIG. 3A illustrates an example process for generating human-like trajectories using a variational autoencoder (VAE).

FIG. 3A illustrates an example process 300A for generating human-like trajectories using a variational autoencoder (VAE). In particular embodiments, the system may use a variational autoencoder (VAE) to refine heuristic-based trajectories and generate corresponding human-like trajectories. As an example and not by way of limitation, the VAE 310 may include an encoder 311 and a decoder 313. The system may feed the heuristic-based trajectory 301 to the encoder 311 of the VAE 310. The encoder 311 may generate a compressed low dimensional digital representation 312 for the input heuristic-based trajectory 301. Then, the decoder 313 may generate a reconstructed trajectory based on the compressed low dimensional digital representation 312. The reconstructed trajectory may be different from the heuristic-based trajectory 311 and may be more similar to human-driven trajectories than the heuristic-based trajectory 301 in one or more aspects related to one or more trajectory parameters or parameter distributions. The reconstructed trajectory may be used as the human-like trajectory 305 for providing riding experience that is more similar to human-driven vehicles.

Figure 3B:
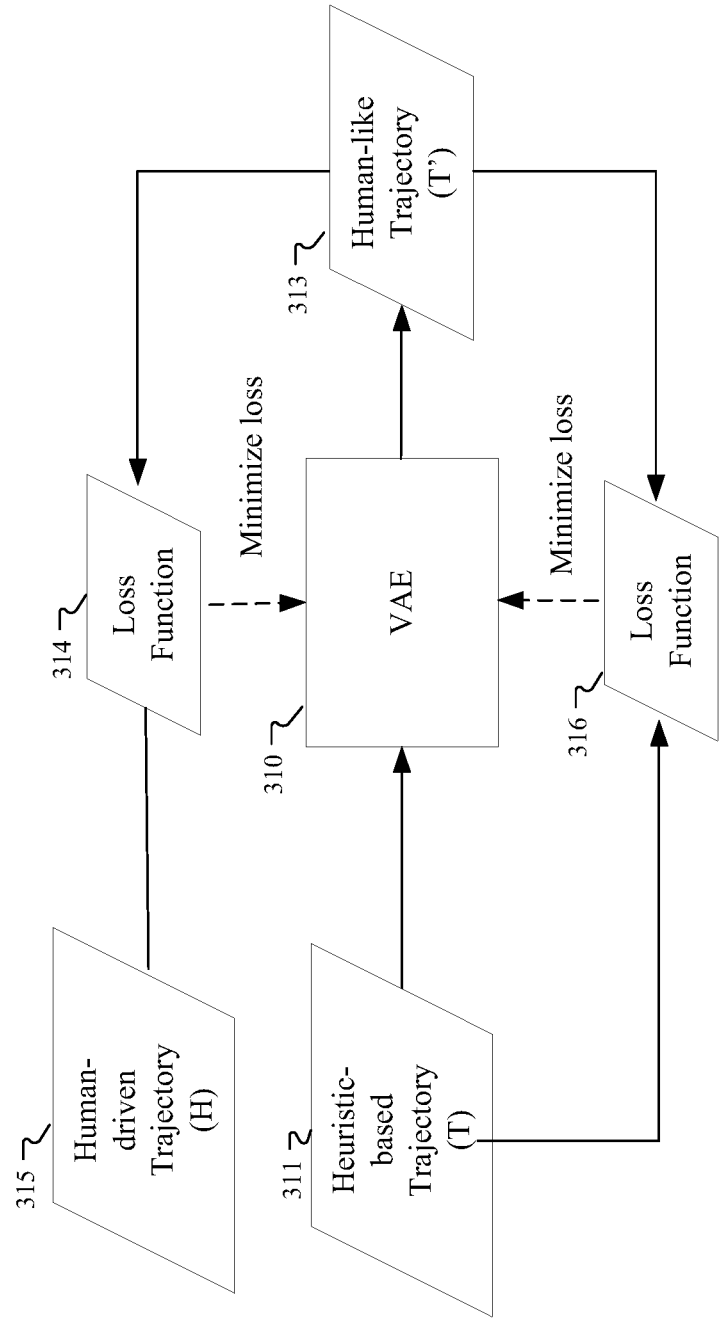
FIG. 3B illustrates an example process for training a variational autoencoder (VAE) to generate human-like trajectories.

FIG. 3B illustrates an example process 300B for training a variational autoencoder (VAE) to generate human-like trajectories. In particular embodiments, the system may train the VAE using a supervised learning process based on pre-generated training samples. For example, the system may pre-generate a number of heuristic-based and human-driven trajectory pairs. The heuristic-based trajectory (denoted by T) and the corresponding human-driven trajectory (denoted by H) in the same trajectory pair may be for navigating vehicles in accordance with the same scenario in the same surrounding environment. During the training process, the system may feed the heuristic-based trajectory 311 to the VAE 310 which may generate the human-like trajectory 313 (denoted by T') based on the heuristic-based trajectory 311. Then, the system may determine a first loss value using the loss function 316 which compares the heuristic-based trajectory 311 to the corresponding human-like trajectory 313. The system may feed the first loss value to the VAE 310 to cause the VAE to be optimized by adjusting one or more parameters to minimize the first loss value as determined by the loss function 316. At the same time, the system may determine a second loss value based on the loss function 314 which compares the human-like trajectory 313 to the corresponding human-driven trajectory 315. The human-driven trajectory 315 may be a trajectory of a human-driven vehicle navigated in accordance with the same scenario in the same surrounding environment with the heuristic-based trajectory 311. Then, the system may feed the second loss value determined using the loss function 314 to the VAE 310 to cause the VAE 310 to be optimized by adjusting one or more parameters to minimize the second loss value determined by the loss function 314. These training processes may be repeated and the VAE 310 may be trained to generate human-like trajectories 313 that are more similar to real human-driven trajectories through these iterative training process.

Figure 4A:
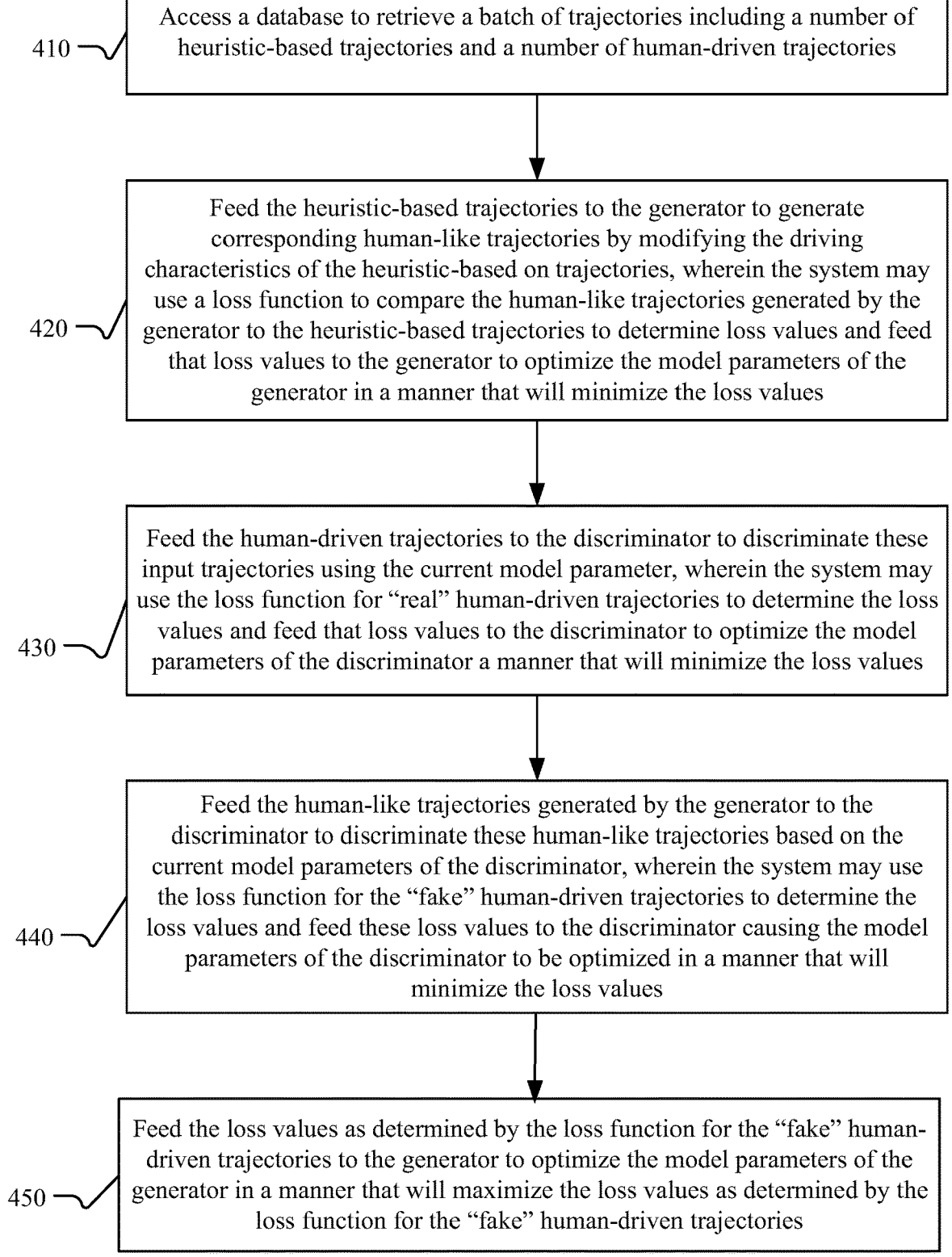
FIG. 4A illustrates an example method for training a ML-based trajectory generator for generating human-like trajectory based on heuristic-based trajectories

FIG. 4A illustrates an example method 400A for training a ML-based trajectory generator for generating human-like trajectory based on heuristic-based trajectories. In particular embodiments, the method may begin at step 410, where a computing system associated with a vehicle and/or a backend computing system may access a database to retrieve a batch of trajectories including a number of heuristic-based trajectories and a number of human-driven trajectories for training the generator (e.g., 202 in FIG. 2A) and the discriminator (e.g., 206 in FIG. 2B). The database may include a number of batches of trajectories with each batch including a number of heuristic-based trajectories and a number of human-driven trajectories. At step 420, the system may feed the heuristic-based trajectories to the generator which may generate corresponding human-like trajectories by modifying the driving characteristics of the heuristic-based on trajectories. The system may use a loss function to compare the human-like trajectories generated by the generator to the heuristic-based trajectories that were fed to the generator to determine loss values and feed that loss values to the generator to optimize the model parameters of the generator. The model parameters of the generator may be optimized in a manner that will minimize the loss values (i.e., minimizing the difference between the generated human-like trajectories and the heuristic trajectories fed to the generator).

At step 430, which may be concurrent to the step 420, the system may feed the human-driven trajectories to the discriminator which may discriminate these input trajectories using the current model parameters. Since these human-driven trajectories are known to be "real" human-driven trajectories, the system may use the loss function for "real" human-driven trajectories (e.g., loss function 209 in FIG. 2A) to determine the loss values and feed that loss values to the discriminator to optimize the model parameters of the discriminator. The model parameters of the discriminator may be optimized in a manner that will minimize the loss values. At step 440, the system may feed the human-like trajectories generated by the generator to the discriminator which may discriminate these human-like trajectories based on the current model parameters of the discriminator. Since these human-like trajectories are known to be "fake" human-driven trajectories, the system may use the loss function for the "fake" human-driven trajectories (e.g., 208 in FIG. 2A) to determine the loss values and feed these loss values to the discriminator. The model parameters of the discriminator may be optimized in a manner that will minimize the loss values as determined by the loss function for "fake" human-driven trajectories. At step 450, which may be concurrent to the step 440, the system may feed the loss values as determined by the loss function for the "fake" human-driven trajectories to the generator to optimize the model parameters of the generator. The model parameters of the generator may be optimized in a manner that will maximize the loss values as determined by the loss function for the "fake" human-driven trajectories.

Particular embodiments may repeat one or more steps of the method of FIG. 4A, where appropriate. Although this disclosure describes and illustrates particular steps of the method of FIG. 4A as occurring in a particular order, this disclosure contemplates any suitable steps of the method of FIG. 4A occurring in any suitable order. Moreover, although this disclosure describes and illustrates an example method for training a ML-based trajectory generator for generating human-like trajectory based on heuristic-based trajectories including the particular steps of the method of FIG. 4A, this disclosure contemplates any suitable method for training a ML-based trajectory generator for generating human-like trajectory based on heuristic-based trajectories including any suitable steps, which may include all, some, or none of the steps of the method of FIG. 4A, where appropriate. Furthermore, although this disclosure describes and illustrates particular components, devices, or systems carrying out particular steps of the method of FIG. 4A, this disclosure contemplates any suitable combination of any suitable components, devices, or systems carrying out any suitable steps of the method of FIG. 4A.

Figure 4B:
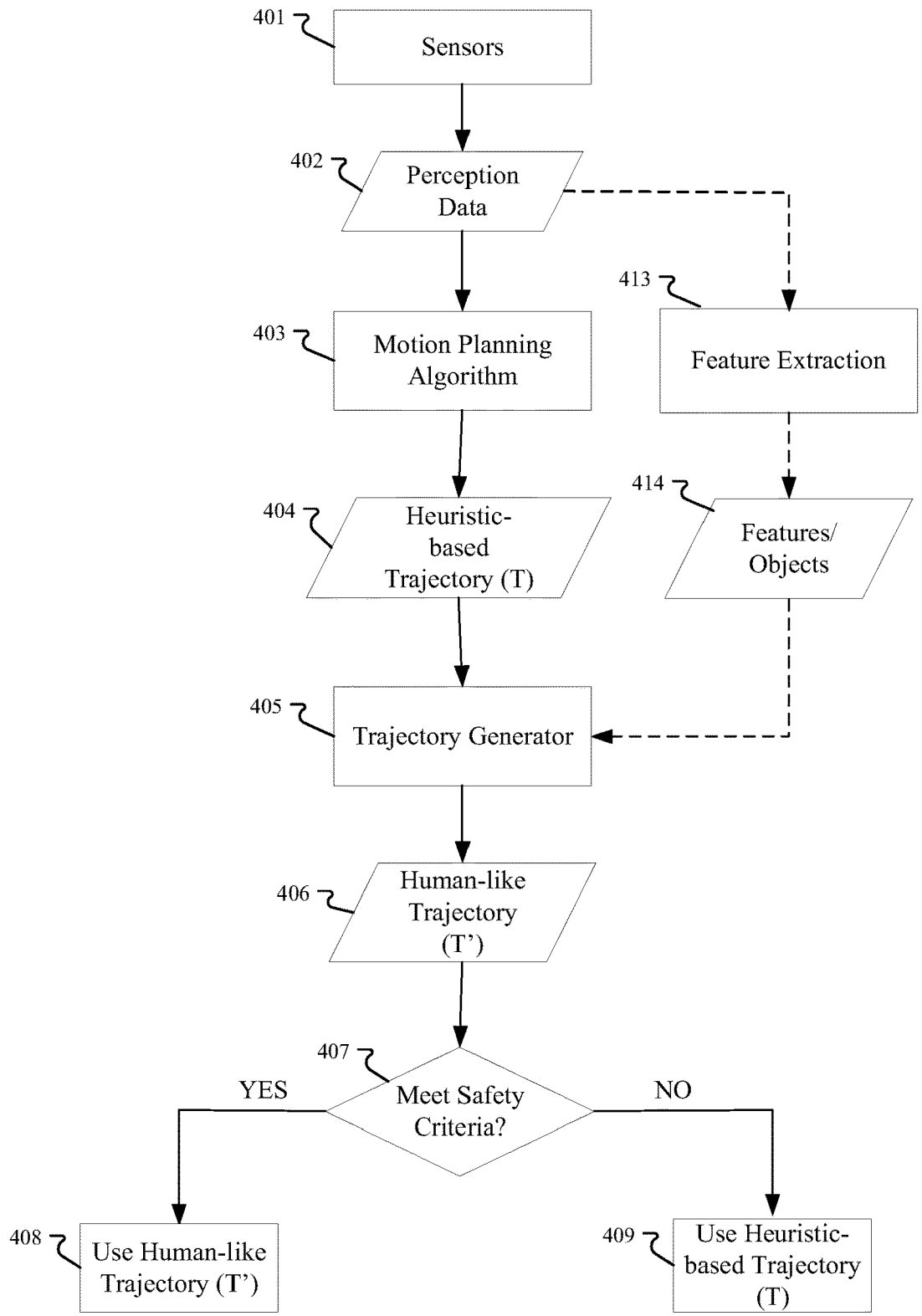
FIG. 4B illustrates an example process for generating and selecting appropriate trajectories to navigate an autonomous vehicle.

FIG. 4B illustrates an example process 400B for generating and selecting appropriate trajectories to navigate an autonomous vehicle. In particular embodiments, after the trajectory generator (e.g., a ML-based trajectory generator, a VAE, a trajectory refining algorithm) has been trained to meet pre-determined criteria, the trajectory generator may be deployed to AVs to improve the riding experience for passengers. As an example and not by way of limitation, an AV may use one or more vehicle sensors 401 to capture the perception data 402 of the surrounding environment. Then, the AV may use a motion planning algorithm 403 to generate a heuristic-based trajectory 404. After that, the AV may use a trajectory generator 405 (e.g., a ML-based trajectory generator, a VAE, a trajectory refining algorithm) to generate a human-like trajectory 406 based on the heuristic-based trajectory 404. In particular embodiments, the system may use a feature extraction algorithm 413 to determine the features or objects (e.g., obstacles, road lanes, road boundaries, etc.) of the surrounding environment based on the perception data 402 and feed the extracted features or objects to the trajectory generator 405. The trajectory generator 405 may refine the heuristic-based trajectories based on the features or objects 414 to generate the human-like trajectory 406. The human-like trajectory 406 may be more similar to human-driven trajectories than the heuristic-based trajectory 404.

In particular embodiments, the human-like trajectory 406 may be different from the heuristic-based trajectory 404 in one or more aspects related to one or more parameters or parameter distributions. For example, the human-like trajectory 406 may have a different distance to a road boundary, a different moving path, a different acceleration distribution profile, a different velocity distribution profile, a different steering angle distribution profile, etc. In general, the human-like trajectory 406, although different from the heuristic-based trajectory 404 in one or more aspects, may deviate from the heuristic-based trajectory 404 no more than a pre-determined range. In some scenarios, if difference between the human-like trajectory 406 and the heuristic-based trajectory 404 is beyond the pre-determined range, the human-like trajectory 406 may become unstable for navigating the AV. In particular embodiments, the AV may evaluate the human-like trajectory 406 using an evaluation algorithm 407 to determine whether the human-like trajectory 406 meets one or more pre-determined safety criteria. In particular embodiments, the pre-determine safety criteria may include, for example, but are not limited to, avoiding collision with other agents in the surrounding environment, keeping safety distances to other agents in the surrounding environment, following the traffic rules, avoiding cross lane boundaries, keeping vehicles under speed limits, or any suitable safety-related criteria. For example, the evaluation algorithm 407 may compare the human-like trajectory 406 to the heuristic-based trajectory 404 to determine a similar metric based on the similarity level of the human-like trajectory 406 and the heuristic-based trajectory 404. The similar metric may be determined based on a matching level of ono or more parameters or one or more parameter distributions between the human-like trajectory 406 and the heuristic-based trajectory 404. The system may determine that the human-like trajectory 406 meets the safety criteria if the similar metric is greater than or equal to a pre-determined threshold. The system may determine that the human-like trajectory 406 fails to meet the safety criteria if the similar metric is below the pre-determined threshold. As another example, the evaluation algorithm 407 may evaluate the human-like trajectory 406 using one or more pre-determined safety rules (e.g., the closest distance to an obstacle being greater than a threshold distance, the maximum velocity or/and maximum acceleration being within a pre-determined range, etc.). The system may determine that the human-like trajectory 406 meets the safety criteria if the human-like trajectory 406 satisfies each of the safety rules. The system may determine that the human-like trajectory 406 fails to meet the safety criteria if the human-like trajectory 406 fails to meet one or more of these safety rules. In response to a determination that the human-like trajectory 406 meets the safety criteria, the AV may determine one or more vehicle operations to navigate based on the human-like trajectory 406. In response to a determination that the human-like trajectory fails to the pre-determined safety criteria, the AV may use the heuristic-based trajectory 404 to determine one or more vehicle operations to navigate the AV based on the heuristic-based trajectory 404.

In particular embodiments, the AV may identify a scenario encountered by the AV in the surrounding environment based on the sensor data from one or more sensors associated with the AV. The AV may predict what other agents in the surrounding environment will do (e.g., positions, moving trajectories, moving speeds, moving directions, etc.) and generate potential trajectories for AV to navigate in the surrounding environment in accordance with the identified scenario. These potential trajectories may be generated based on one or more heuristic rules and the identified scenario. As discussed in earlier sections of this disclosure, the heuristic-based trajectories may be different from human-driven trajectories in one or more aspects (e.g., different parameter distribution profiles). In particular embodiments, a computing system associated with the AV and/or a backend computing system may use the systems, methods, and processes as described in this disclosure to generate human-like trajectories by modifying one or more driving characteristics of the heuristic-based trajectories. The human-like trajectories may have a higher similarity level with respect to the human-driven trajectories than the heuristic-based trajectories. The human-like trajectories may have one or more driving characteristic that satisfy a similarity threshold related to the human-driving characteristics of observed human-driven trajectories.

In particular embodiments, the AV may generate a number of human-like trajectories that satisfy the similarity threshold and evaluate these human-like trajectories based on their similarity with respect to human-driven trajectories (in addition to the safety criteria as discussed above). For example, the AV may determine, for each human-like trajectory, a similarity metric with respect to one or more observed human-driven trajectories. The similarity metric may be determined based on a comparison of: one or more driving characteristics, one or more trajectory parameter values, one or more trajectory parameter distributions (e.g., over the moving path or over time), one or more trajectory parameter profiles, or a combination of thereof. The AV may score and rank the human-like trajectories based on the determined similarity metric and select the human-like trajectory with the highest score for determining the vehicle operations. It is notable that, for a vehicle driving in the surrounding environment, its observed moving trajectory may be determined to be a heuristic-based trajectory, that was generated based on heuristics, or a human-like trajectory, that was generated using the systems, methods, and processes as described in this disclosure, by comparing that observed moving trajectory to observed human-driven trajectories. For example, a similarity level of an observed vehicle moving trajectory may be determined based on a comparison of one or more driving characteristics, one or more trajectory parameter values, one or more trajectory parameter distributions (e.g., over the moving path or over time), one or more trajectory parameter profiles, or a combination of thereof, with respect to observed human-driven trajectories. The observed vehicle moving trajectory may be identified to be a human-like trajectory generated using the systems, methods, and processes as described in this disclosure based on a determination that its corresponding similarity to observed human-driven trajectories satisfying the pre-determined similarity threshold. In particular embodiments, the pre-determined similarity threshold may be, for example, but are not limited to, 5%, 1%, etc., and may be redetermined based on experiential data.

Figure 5:
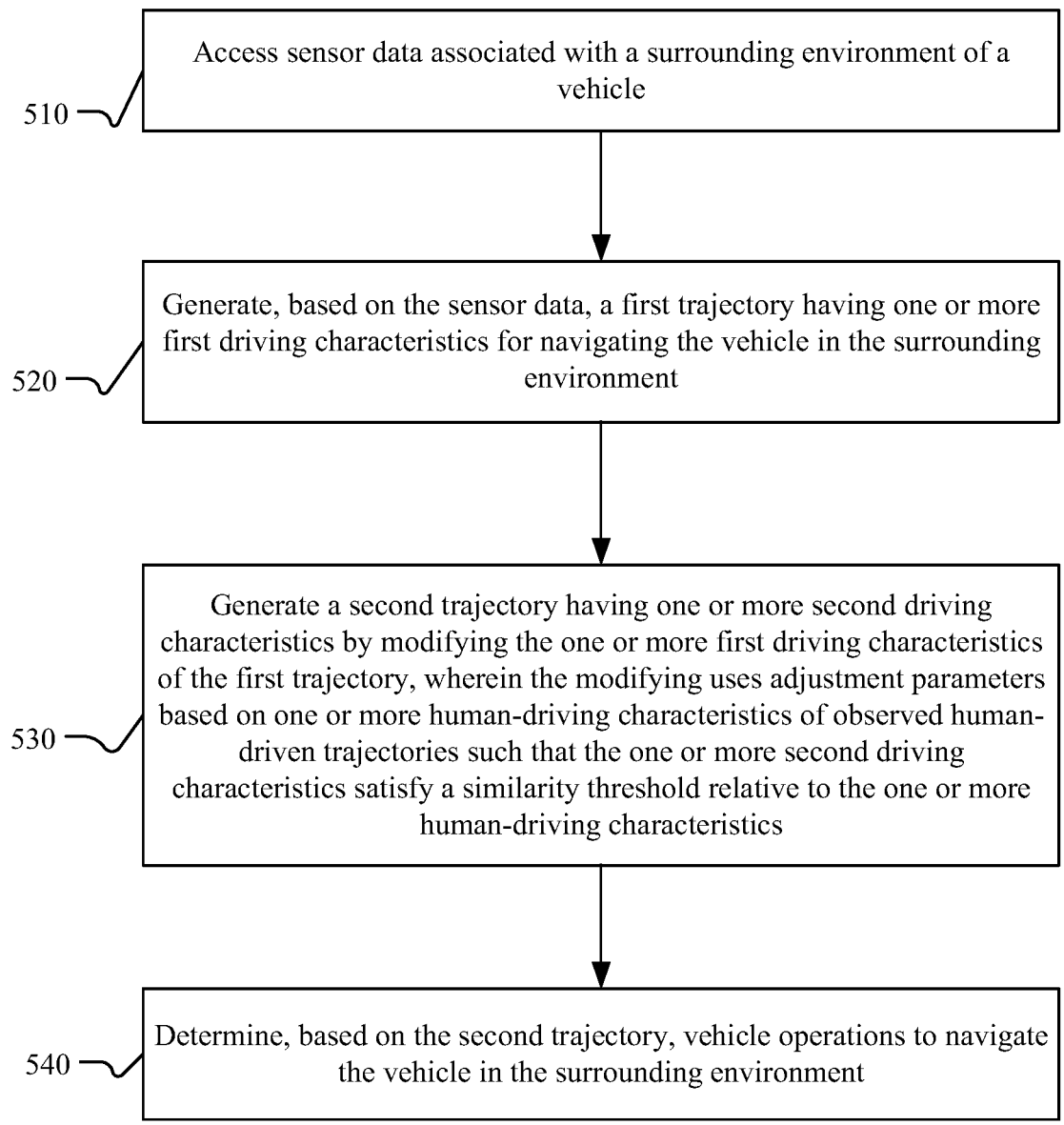
FIG. 5 illustrates an example method for generating human-like trajectory based on heuristic-based trajectories.

FIG. 5 illustrates an example method 500 for generating human-like trajectory based on heuristic-based trajectories. In particular embodiments, the method may begin at step 510, where a computing system associated with a vehicle may access sensor data associated with a surrounding environment of a vehicle. At step 520, the system may generate, based on the sensor data, a first trajectory having one or more first driving characteristics for navigating the vehicle in the surrounding environment. At step 530, the system may generate a second trajectory having one or more second driving characteristics by modifying the one or more first driving characteristics of the first trajectory. The modifying may use adjustment parameters based on one or more human-driving characteristics of observed human-driven trajectories such that the one or more second driving characteristics satisfy a similarity threshold relative to the one or more human-driving characteristics. At step 540, the system may determine, based on the second trajectory, vehicle operations to navigate the vehicle in the surrounding environment. In particular embodiments, the one or more first driving characteristics may be associated with a first distribution. The second driving characteristics may be associated with a second distribution. The second distribution may be more similar than the first distribution to a third distribution associated with the observed human-driven trajectories.

In particular embodiments, the adjustment parameters may be generated by a machine-learning model that is trained based on loss values determined by one or more loss functions based on human-like trajectories generated by the machine-learning model during training and the observed human-driven trajectories. In particular embodiments, the machine-learning model may be a variational autoencoder (VAE) trained based on comparisons between human-like trajectories generated by the VAE with the observed human-driven trajectories. In particular embodiments, the first trajectory may be a heuristic-based trajectory generated by a motion planning algorithm. The adjustment parameters may be optimized based on first loss values determined by a first loss function by comparing human-like trajectories generated by a machine-learning model with corresponding heuristic-based trajectories. In particular embodiments, the machine-learning model may have one or more model parameters adjusted to minimize the first loss values determined by the first loss function by comparing the human-like trajectories generated by the machine-learning model with the corresponding heuristic-based trajectories. In particular embodiments, the machine-learning model may correspond to a generator of a generative adversarial network (GAN). The machine-learning model may be trained based on second loss values determined by a second loss function associated with a discriminator of the generative adversarial network (GAN). In particular embodiments, the machine-learning model may have one or more parameter adjusted to maximize the second loss values determined by the second loss function associated with the discriminator of the generative adversarial network (GAN).

In particular embodiments, the discriminator may be trained based on a number of labeled training samples to discriminate real and fake human-driven trajectories. The labeled training samples may be associated with a number of representative scenarios capable of being encountered by the vehicle in the surrounding environment. In particular embodiments, the first trajectory may be a heuristic-based trajectory and the second trajectory may be a human-like trajectory. The system may generate a number of human-like trajectories by modifying the one or more first driving characteristics of a number of heuristic-based trajectories. The system may select a human-like trajectory from the number of human-like trajectories based on one or more pre-determined criteria. The vehicle operations may be determined based on the selected human-like trajectory. In particular embodiments, the system may identify a scenario encountered by the vehicle in the surrounding environment. The second trajectory may be generated by modifying the one or more first driving characteristics based on the identified scenario. The system may compare the one or more second driving characteristics of the second trajectory to one or more human-driven profiles associated with the identified scenario. The one or more second characteristics satisfying the similarity threshold relative to the one or more human-driving characteristics may be determined based on this above comparison. In particular embodiments, the discriminator may determine, for the second trajectory, a first probability value for the second trajectory to be a real human-driving trajectory or a second probability value for the second trajectory to be a fake human-driving trajectory.

In particular embodiments, the machine-learning model may be trained based on data samples originated from a plurality of data sources comprising one or more of: a camera, a LiDAR system, or an inertial measurement unit (IMU). In particular embodiments, prior to generating the second trajectory, the system may predict, based on the sensor data, trajectories of one or more objects in the surrounding environment and generate the first trajectory based on the sensor data and the predicted trajectories of the one or more objects in the surrounding environment. In particular embodiments, the first and second driving characteristics may be associated with a parameter of a plurality of parameters including one or more of: a distance to a road boundary, a distance to a center lane, a distance to a road lane, a distance to a moving agent, an acceleration of the vehicle, a deacceleration of the vehicle, a velocity of the vehicle, a moving direction of the vehicle, a steering direction of the vehicle, a head direction of the vehicle, a position of the vehicle, a turning radius, a moving path, or a parameter distribution. In particular embodiments, the system may determine, during a training process of a machine-learning model used for generating the second trajectory, that one or more human-like trajectories generated by the machine-learning model satisfy one or more pre-determined training criteria in response to the one or more human-like trajectories satisfying the similarity threshold relative to the one or more human-driving characteristics. In particular embodiments, the system may determine a similarity metric between the first trajectory and the second trajectory. The system may determine whether the second trajectory satisfies one or more safety criteria for navigating the vehicle in the surrounding environment based on the similarity metric. In particular embodiments, the system may, in response to the second trajectory satisfying the one or more safety criteria, navigate the vehicle in the surrounding environment based on the second trajectory. The system may, in response to the second trajectory failing to satisfy the one or more safety criteria, navigate the vehicle in the surrounding environment based on the first trajectory.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for generating human-like trajectory based on heuristic-based trajectories including the particular steps of the method of FIG. 5, this disclosure contemplates any suitable method for generating human-like trajectory based on heuristic-based trajectories including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
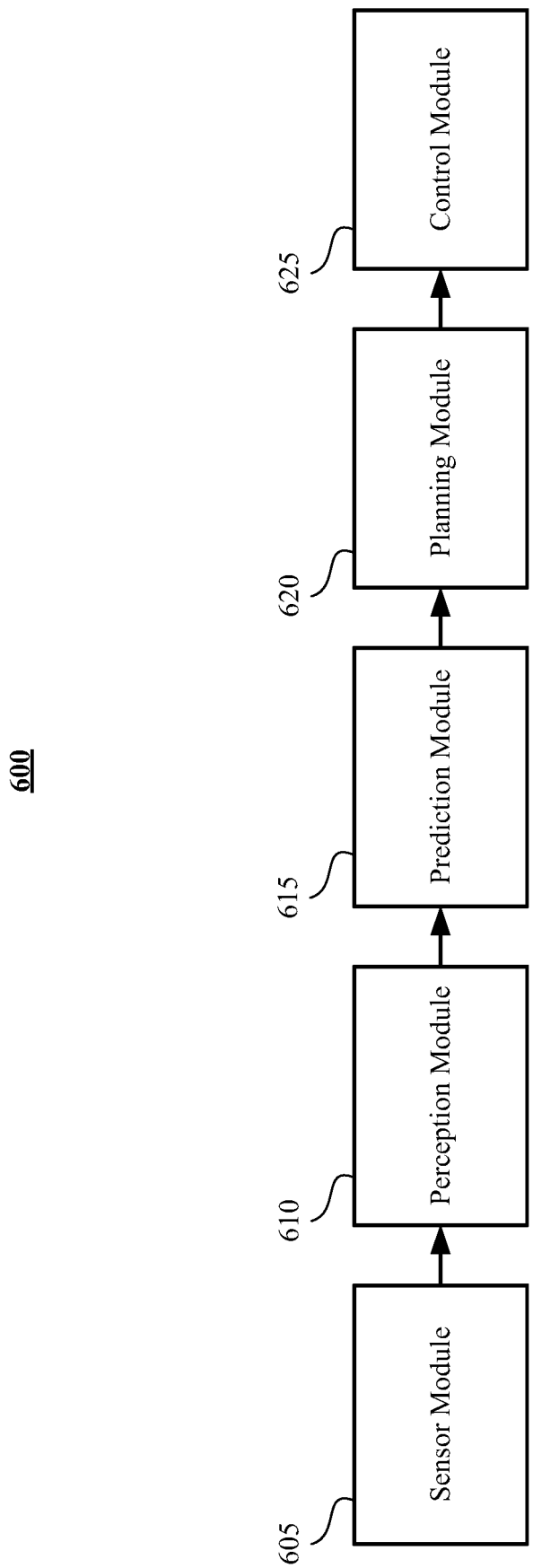
FIG. 6 illustrates an example block diagram of an algorithmic navigation pipeline.

FIG. 6 illustrates an example block diagram 600 of an algorithmic navigation pipeline. In particular embodiments, an algorithmic navigation pipeline 600 may include a number of computing modules, such as a sensor data module 605, perception module 610, prediction module 615, planning module 620, and control module 625. Sensor data module 605 may obtain and pre-process sensor/telemetry data that is provided to perception module 610. Such data may be captured by any suitable sensors of a vehicle. As an example and not by way of limitation, the vehicle may have a Light Detection and Ranging (LiDAR) sensor that is configured to transmit pulsed laser beams in multiple directions and measure the reflected signal from objects surrounding vehicle. The time of flight of the light signals may be used to measure the distance or depth of the objects from the LiDAR. As another example, the vehicle may have optical cameras pointing in different directions to capture images of the vehicle's surrounding. Radars may also be used by the vehicle for detecting other vehicles and/or hazards at a distance. As further examples, the vehicle may be equipped with ultrasound for close range object detection, e.g., parking and obstacle detection or infrared cameras for object detection in low-light situations or darkness. In particular embodiments, sensor data module 605 may suppress noise in the sensor data or normalize the sensor data.

Perception module 610 is responsible for correlating and fusing the data from the different types of sensors of the sensor module 605 to model the contextual environment of the vehicle. Perception module 610 may use information extracted by multiple independent sensors to provide information that would not be available from any single type of sensors. Combining data from multiple sensor types allows the perception module 610 to leverage the strengths of different sensors and more accurately and precisely perceive the environment. As an example and not by way of limitation, image-based object recognition may not work well in low-light conditions. This may be compensated by sensor data from LiDAR or radar, which are effective sensors for measuring distances to targets in low-light conditions. As another example, image-based object recognition may mistakenly determine that an object depicted in a poster is an actual three-dimensional object in the environment. However, if depth information from a LiDAR is also available, the perception module 610 could use that additional information to determine that the object in the poster is not, in fact, a three-dimensional object.

Perception module 610 may process the available data (e.g., sensor data, data from a high-definition map, etc.) to derive information about the contextual environment. For example, perception module 610 may include one or more agent modelers (e.g., object detectors, object classifiers, or machine-learning models trained to derive information from the sensor data) to detect and/or classify agents present in the environment of the vehicle (e.g., other vehicles, pedestrians, moving objects). Perception module 610 may also determine various characteristics of the agents. For example, perception module 610 may track the velocities, moving directions, accelerations, trajectories, relative distances, or relative positions of these agents. In particular embodiments, the perception module 610 may also leverage information from a high-definition map. The high-definition map may include a precise three-dimensional model of the environment, including buildings, curbs, street signs, traffic lights, and any stationary fixtures in the environment. Using the vehicle's GPS data and/or image-based localization techniques (e.g., simultaneous localization and mapping, or SLAM), the perception module 610 could determine the pose (e.g., position and orientation) of the vehicle or the poses of the vehicle's sensors within the high-definition map. The pose information, in turn, may be used by the perception module 610 to query the high-definition map and determine what objects are expected to be in the environment.

Perception module 610 may use the sensor data from one or more types of sensors and/or information derived therefrom to generate a representation of the contextual environment of the vehicle. As an example and not by way of limitation, the representation of the external environment may include objects such as other vehicles, curbs, debris, objects, and pedestrians. The contextual representation may be limited to a maximum range of the sensor array (e.g., 50, 100, or 200 meters). The representation of the contextual environment may include information about the agents and objects surrounding the vehicle, as well as semantic information about the traffic lanes, traffic rules, traffic signs, time of day, weather, and/or any other suitable information. The contextual environment may be represented in any suitable manner. As an example and not by way of limitation, the contextual representation may be encoded as a vector or matrix of numerical values, with each value in the vector/matrix corresponding to a predetermined category of information. For example, each agent in the environment may be represented by a sequence of values, starting with the agent's coordinate, classification (e.g., vehicle, pedestrian, etc.), orientation, velocity, trajectory, and so on. Alternatively, information about the contextual environment may be represented by a raster image that visually depicts the agent, semantic information, etc. For example, the raster image may be a birds-eye view of the vehicle and its surrounding, up to a predetermined distance. The raster image may include visual information (e.g., bounding boxes, color-coded shapes, etc.) that represent various data of interest (e.g., vehicles, pedestrians, lanes, buildings, etc.).

The representation of the present contextual environment from the perception module 610 may be consumed by a prediction module 615 to generate one or more predictions of the future environment. For example, given a representation of the contextual environment at time $t_0$, the prediction module 615 may output another contextual representation for time $t_1$. For instance, if the to contextual environment is represented by a raster image, the output of the prediction module 615 may be another raster image (e.g., a snapshot of the current environment) that depicts where the agents would be at time $t_1$ (e.g., a snapshot of the future). In particular embodiments, prediction module 615 may include a machine-learning model (e.g., a convolutional neural network, a neural network, a decision tree, support vector machines, etc.) that may be trained based on previously recorded contextual and sensor data. For example, one training sample may be generated based on a sequence of actual sensor data captured by a vehicle at times $t_0$ and $t_1$. The captured data at times $t_0$ and $t_1$ may be used to generate, respectively, a first contextual representation (the training data) and a second contextual representation (the associated ground-truth used for training). During training, the machine-learning model may process the first contextual representation using the model's current configuration parameters and output a predicted contextual representation. The predicted contextual representation may then be compared to the known second contextual representation (i.e., the ground-truth at time $t_1$). The comparison may be quantified by a loss value, computed using a loss function. The loss value may be used (e.g., via back-propagation techniques) to update the configuration parameters of the machine-learning model so that the loss would be less if the prediction were to be made again. The machine-learning model may be trained iteratively using a large set of training samples until a convergence or termination condition is met. For example, training may terminate when the loss value is below a predetermined threshold. Once trained, the machine-learning model may be used to generate predictions of future contextual representations based on current contextual representations.

Planning module 620 may determine the navigation routes and particular driving operations (e.g., slowing down, speeding up, stopping, swerving, etc.) of the vehicle based on the predicted contextual representation generated by the prediction module 615. In particular embodiments, planning module 620 may utilize the predicted information encoded within the predicted contextual representation (e.g., predicted location or trajectory of agents, semantic data, etc.) and any other available information (e.g., map data, traffic data, accident reports, weather reports, target destinations, and any other suitable information) to determine one or more goals or navigation instructions for the vehicle. As an example and not by way of limitation, based on the predicted behavior of the agents surrounding the vehicle and the traffic data to a particular destination, planning module 620 may determine a particular navigation path and associated driving operations for the vehicle to avoid possible collisions with one or more agents. In particular embodiments, planning module 620 may generate, based on a given predicted contextual presentation, several different plans (e.g., goals or navigation instructions) for the vehicle. For each plan, the planning module 620 may compute a score that represents the desirability of that plan. For example, if the plan would likely result in the vehicle colliding with an agent at a predicted location for that agent, as determined based on the predicted contextual representation, the score for the plan may be penalized accordingly. Another plan that would cause the vehicle to violate traffic rules or take a lengthy detour to avoid possible collisions may also have a score that is penalized, but the penalty may be less severe than the penalty applied for the previous plan that would result in collision. A third plan that causes the vehicle to simply stop or change lanes to avoid colliding with the agent in the predicted future may receive the highest score. Based on the assigned scores for the plans, the planning module 620 may select the best plan to carry out. While the example above used collision as an example, the disclosure herein contemplates the use of any suitable scoring criteria, such as travel distance or time, fuel economy, changes to the estimated time of arrival at the destination, passenger comfort, proximity to other vehicles, the confidence score associated with the predicted contextual representation, etc.

Based on the plan generated by planning module 620, which may include one or more navigation path or associated driving operations, control module 625 may determine the specific commands to be issued to the actuators of the vehicle. The actuators of the vehicle are components that are responsible for moving and controlling the vehicle. The actuators control driving functions of the vehicle, such as for example, steering, turn signals, deceleration (braking), acceleration, gear shift, etc. As an example and not by way of limitation, control module 625 may transmit commands to a steering actuator to maintain a particular steering angle for a particular amount of time to move a vehicle on a particular trajectory to avoid agents predicted to encroach into the area of the vehicle. As another example, control module 625 may transmit commands to an accelerator actuator to have the vehicle safely avoid agents predicted to encroach into the area of the vehicle.

Figure 7:
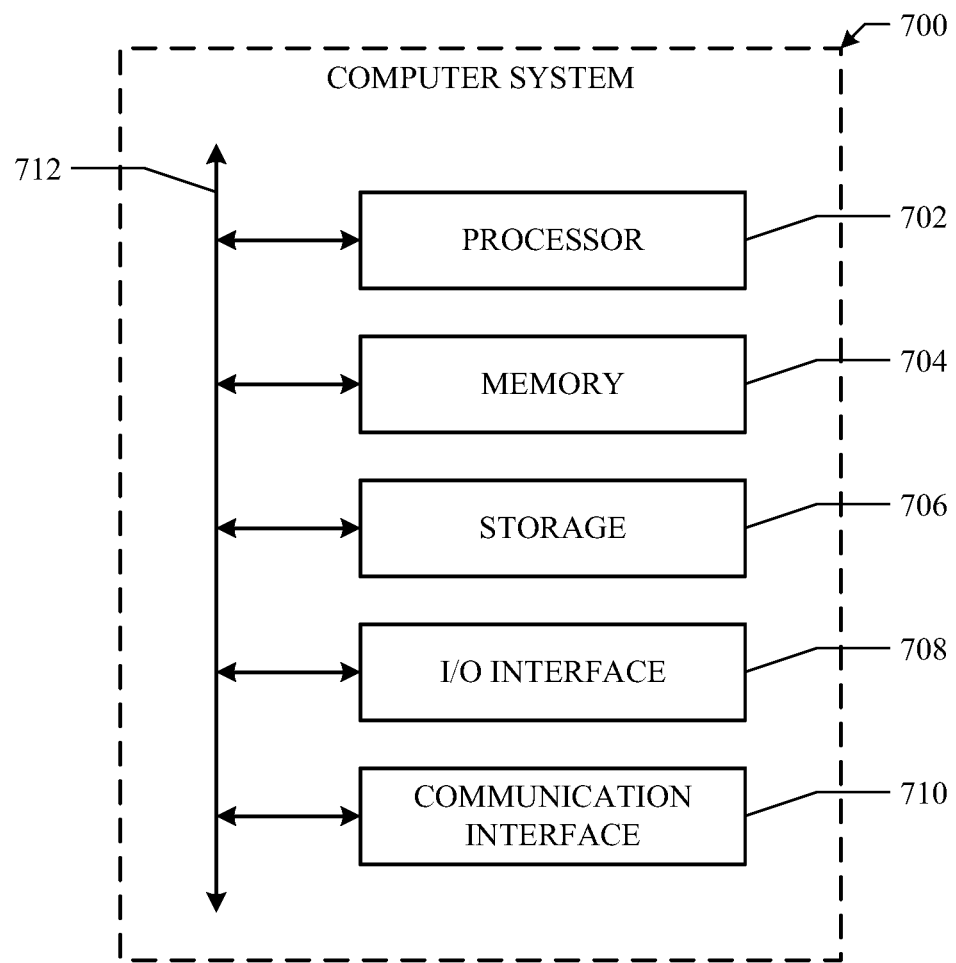
FIG. 7 illustrates an example computing system.

FIG. 7 illustrates an example computer system 700. In particular embodiments, one or more computer systems 700 perform one or more steps of one or more methods described or illustrated herein. In particular embodiments, one or more computer systems 700 provide the functionalities described or illustrated herein. In particular embodiments, software running on one or more computer systems 700 performs one or more steps of one or more methods described or illustrated herein or provides the functionalities described or illustrated herein. Particular embodiments include one or more portions of one or more computer systems 700. Herein, a reference to a computer system may encompass a computing device, and vice versa, where appropriate. Moreover, a reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a remote server computer, which may include one or more remote server computing components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 that are to be operated on by computer instructions; the results of previous instructions executed by processor 702 that are accessible to subsequent instructions or for writing to memory 704 or storage 706; or any other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs), be a multi-core processor, or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described in further detail below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
accessing sensor data associated with a surrounding environment of a vehicle;
generating, based on the sensor data and using a heuristic that is a rule-based algorithm that is not a machine-learning algorithm, a first trajectory having one or more first driving characteristics that are not human-like for navigating the vehicle in the surrounding environment;
generating, using the first trajectory as an input to a machine-learning generator, a second trajectory having one or more second driving characteristics by modifying the one or more first driving characteristics of the first trajectory using adjustment parameters from the machine-learning generator based on one or more human-driving characteristics of observed human-driven trajectories such that the one or more second driving characteristics satisfy a similarity threshold relative to the one or more human-driving characteristics, wherein the first trajectory and the second trajectory define separate vehicle moving paths for the vehicle to move from a first point to a second point and include a series of spatial-temporal points; and
controlling the vehicle using vehicle operations based on the second trajectory to navigate the vehicle in the surrounding environment.

2. The method of claim 1, wherein the one or more first driving characteristics are associated with a first distribution, wherein the second driving characteristics are associated with a second distribution, and wherein the second distribution is more similar than the first distribution to a third distribution associated with the observed human-driven trajectories.

3. The method of claim 1, wherein the adjustment parameters are generated by the machine-learning generator that is a machine-learning model that is trained based on loss values determined by one or more loss functions based on human-like trajectories generated by the machine-learning model during training and the observed human-driven trajectories.

4. The method of claim 3, wherein the machine-learning model is a variational autoencoder (VAE) trained based on comparisons between the human-like trajectories generated by the VAE with the observed human-driven trajectories.

5. The method of claim 3, wherein the machine-learning model is trained based on data samples originated from a plurality of data sources comprising one or more of: a camera, a LiDAR system, or an inertial measurement unit (IMU).

6. The method of claim 1, wherein the first trajectory is a heuristic-based trajectory generated by the rule-based algorithm that is a motion planning algorithm, and wherein one or more model parameters of a machine-learning model is optimized based on first loss values determined by a first loss function by comparing human-like trajectories generated by the machine-learning model with corresponding heuristic-based trajectories.

7. The method of claim 6, wherein the machine-learning model has one or more model parameters being adjusted to minimize the first loss values determined by the first loss function.

8. The method of claim 6, wherein the machine-learning model corresponds to a generator of a generative adversarial network (GAN), and wherein the machine-learning model is trained based on second loss values determined by a second loss function associated with a discriminator of the generative adversarial network (GAN).

9. The method of claim 8, wherein the machine-learning model has one or more parameters adjusted to maximize the second loss values determined by the second loss function associated with the discriminator of the generative adversarial network (GAN).

10. The method of claim 8, wherein the discriminator is trained based on a plurality of labeled training samples to discriminate real and fake human-driven trajectories, and wherein the plurality of labeled training samples are associated with a plurality of representative scenarios capable of being encountered by the vehicle in the surrounding environment.

11. The method of claim 10, wherein the first trajectory is a heuristic-based trajectory and the second trajectory is a human-like trajectory, and wherein the method further comprises:
generating a plurality of heuristic-based trajectories;
generating a plurality of human-like trajectories by modifying the one or more first driving characteristics of the plurality of heuristic-based trajectories; and
selecting a human-like trajectory from the plurality of human-like trajectories based on one or more pre-determined criteria, wherein the vehicle operations are determined based on the selected human-like trajectory.

12. The method of claim 10, further comprising:
identifying a scenario encountered by the vehicle in the surrounding environment, wherein the second trajectory is generated by modifying the one or more first driving characteristics based on the identified scenario; and
comparing the one or more second driving characteristics of the second trajectory to one or more human-driven profiles associated with the identified scenario, wherein the one or more second driving characteristics satisfying the similarity threshold relative to the one or more human- driving characteristics is determined based on the comparison.

13. The method of claim 10, wherein the discriminator determines, for the second trajectory, a first probability value for the second trajectory to be a real human-driven trajectory or a second probability value for the second trajectory to be a fake human-driven trajectory.

14. The method of claim 1, wherein prior to generating the second trajectory, the method further comprises:
predicting, based on the sensor data, trajectories of one or more objects in the surrounding environment; and
generating the first trajectory based on the sensor data and the predicted trajectories of the one or more objects in the surrounding environment.

15. The method of claim 1, wherein the one or more first and second driving characteristics are associated with one or more of: a distance to a road boundary, a distance to a center lane, a distance to a road lane, a distance to a moving agent, an acceleration of the vehicle, a deacceleration of the vehicle, a velocity of the vehicle, a moving direction of the vehicle, a steering direction of the vehicle, a head direction of the vehicle, a position of the vehicle, a turning radius, a moving path, or a parameter distribution.

16. The method of claim 1, further comprising:
determining, during a training process of a machine-learning model used for generating the second trajectory, that one or more human-like trajectories generated by the machine- learning model satisfy one or more pre-determined training criteria in response to the one or more human-like trajectories satisfying the similarity threshold relative to the one or more human-driving characteristics.

17. The method of claim 1, further comprising:
determining a similarity metric between the first trajectory and the second trajectory; and
determining whether the second trajectory satisfies one or more safety criteria for navigating the vehicle in accordance with the surrounding environment based on the similarity metric.

18. The method of claim 17, further comprising:
in response to the second trajectory satisfying the one or more safety criteria, navigating the vehicle in the surrounding environment based on the second trajectory; and
in response to the second trajectory failing to satisfy the one or more safety criteria, navigating the vehicle in the surrounding environment based on the first trajectory.

19. One or more non-transitory computer-readable storage media including instructions that, when executed by one or more processors of a computing system, are operable to cause the one or more processors to:
access sensor data associated with a surrounding environment of a vehicle;
generate, based on the sensor data and using a heuristic that is a rule-based algorithm that is not a machine-learning algorithm, a first trajectory having one or more first driving characteristics for navigating the vehicle in the surrounding environment;
generate, using a machine-learning generator and the first trajectory, a second trajectory having one or more second driving characteristics by modifying the one or more first driving characteristics of the first trajectory using adjustment parameters from the machine-learning generator based on one or more human-driving characteristics of observed human-driven trajectories such that the one or more second driving characteristics satisfy a similarity threshold relative to the one or more human-driving characteristics, wherein the first trajectory and the second trajectory define separate vehicle moving paths for the vehicle to move from a first point to a second point and include a series of spatial-temporal points; and
control the vehicle using vehicle operations based on the second trajectory to navigate the vehicle in the surrounding environment.

20. A system comprising:
one or more non-transitory computer-readable storage media including instructions; and
one or more processors coupled to the non-transitory computer-readable storage media and operable to execute the instructions to:
access sensor data associated with a surrounding environment of a vehicle;
generate, based on the sensor data and using a heuristic that is a rule-based algorithm that is not a machine-learning algorithm, a first trajectory having one or more first driving characteristics for navigating the vehicle in the surrounding environment;
generate, using a machine-learning generator and the first trajectory, a second trajectory having one or more second driving characteristics by modifying the one or more first driving characteristics of the first trajectory using adjustment parameters from the machine-learning generator based on one or more human-driving characteristics of observed human-driven trajectories such that the one or more second driving characteristics satisfy a similarity threshold relative to the one or more human-driving characteristics, wherein the first trajectory and the second trajectory define separate vehicle moving paths for the vehicle to move from a first point to a second point and include a series of spatial-temporal points; and control the vehicle using vehicle operations based on the second trajectory to navigate the vehicle in the surrounding environment.

* * * * *